Nov. 8, 1966   D. S. FETTERMAN ET AL   3,283,838
APPARATUS AND METHOD FOR COMPUTING EQUIVALENT
WEIGHT OF TRACTOR TRAILER VEHICLE
Filed Aug. 17, 1964   6 Sheets-Sheet 1

INVENTORS
DAVID S. FETTERMAN
JEROLD B. MUSKIN
BY Robert C. Sullivan
ATTORNEY

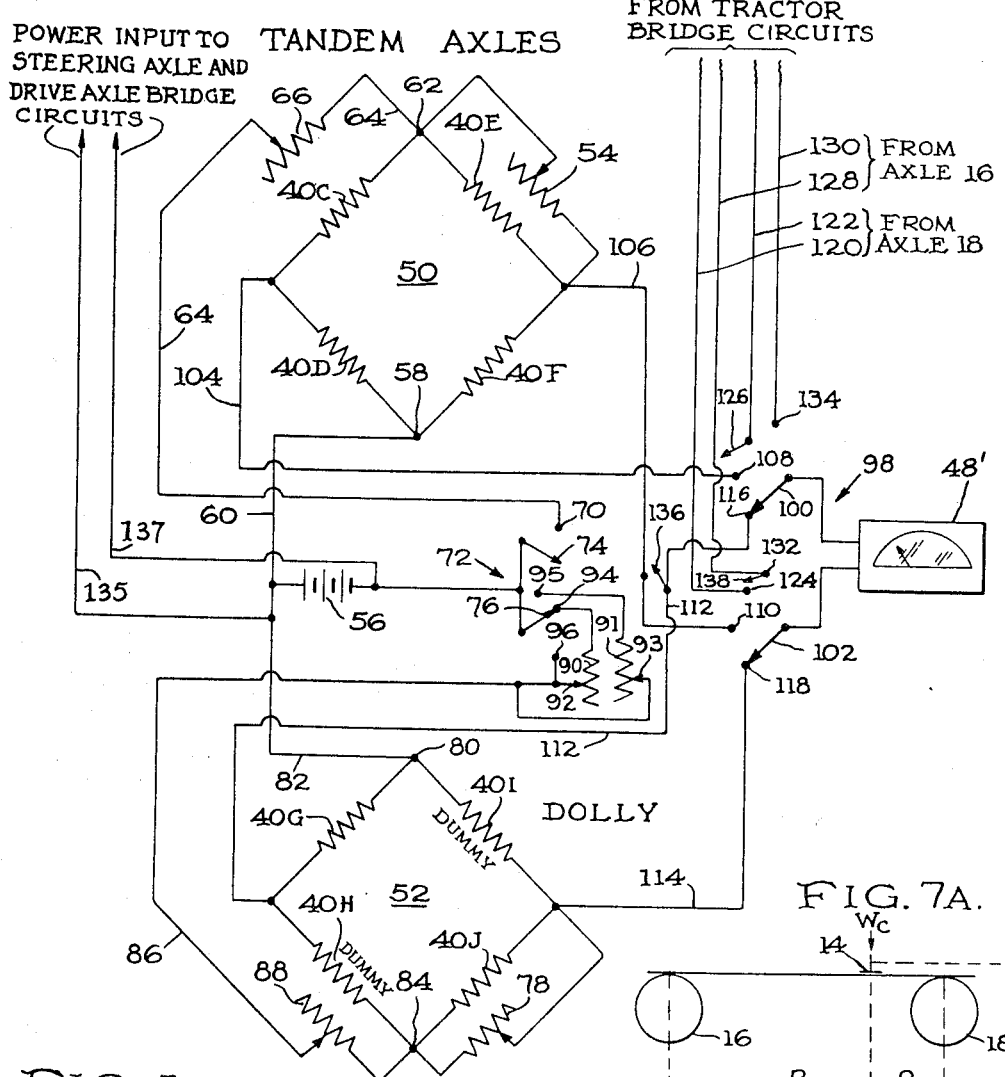
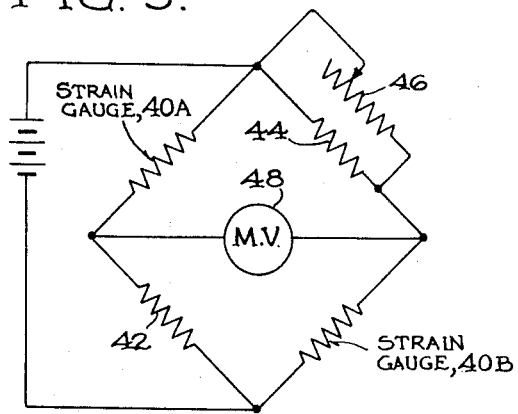
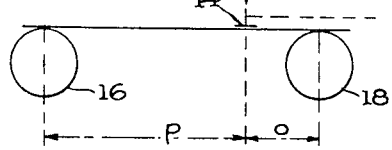

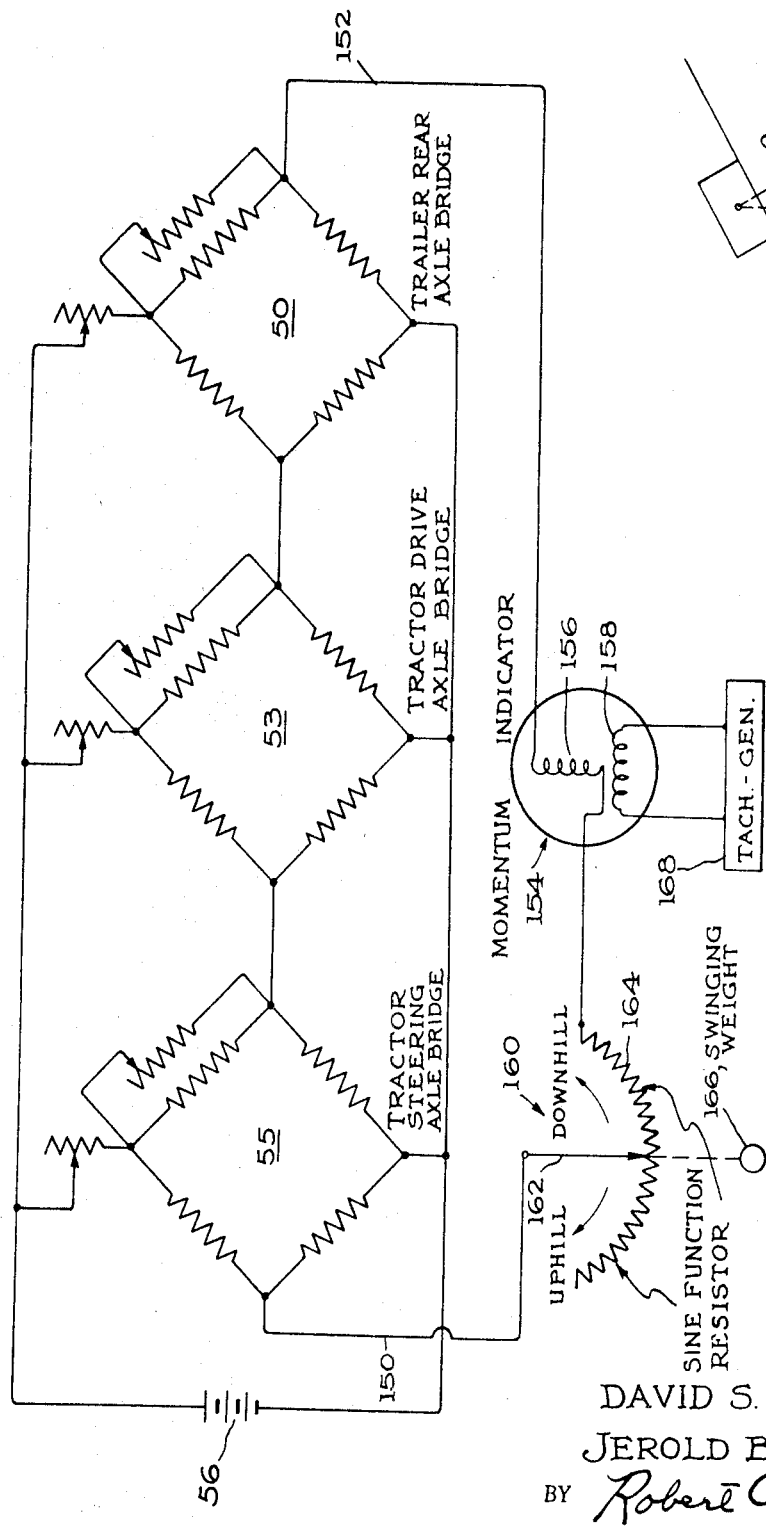
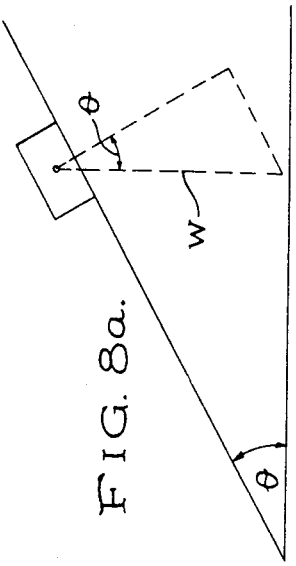
FIG. 8.
FIG. 8a.
INVENTORS
DAVID S. FETTERMAN
JEROLD B. MUSKIN
BY Robert C. Sullivan
ATTORNEY Nov. 8, 1966

D. S. FETTERMAN ET AL  3,283,838
APPARATUS AND METHOD FOR COMPUTING EQUIVALENT
WEIGHT OF TRACTOR TRAILER VEHICLE

Filed Aug. 17, 1964  6 Sheets-Sheet 4

INVENTORS
DAVID S. FETTERMAN
JEROLD B. MUSKIN
BY Robert C. Sullivan
ATTORNEY

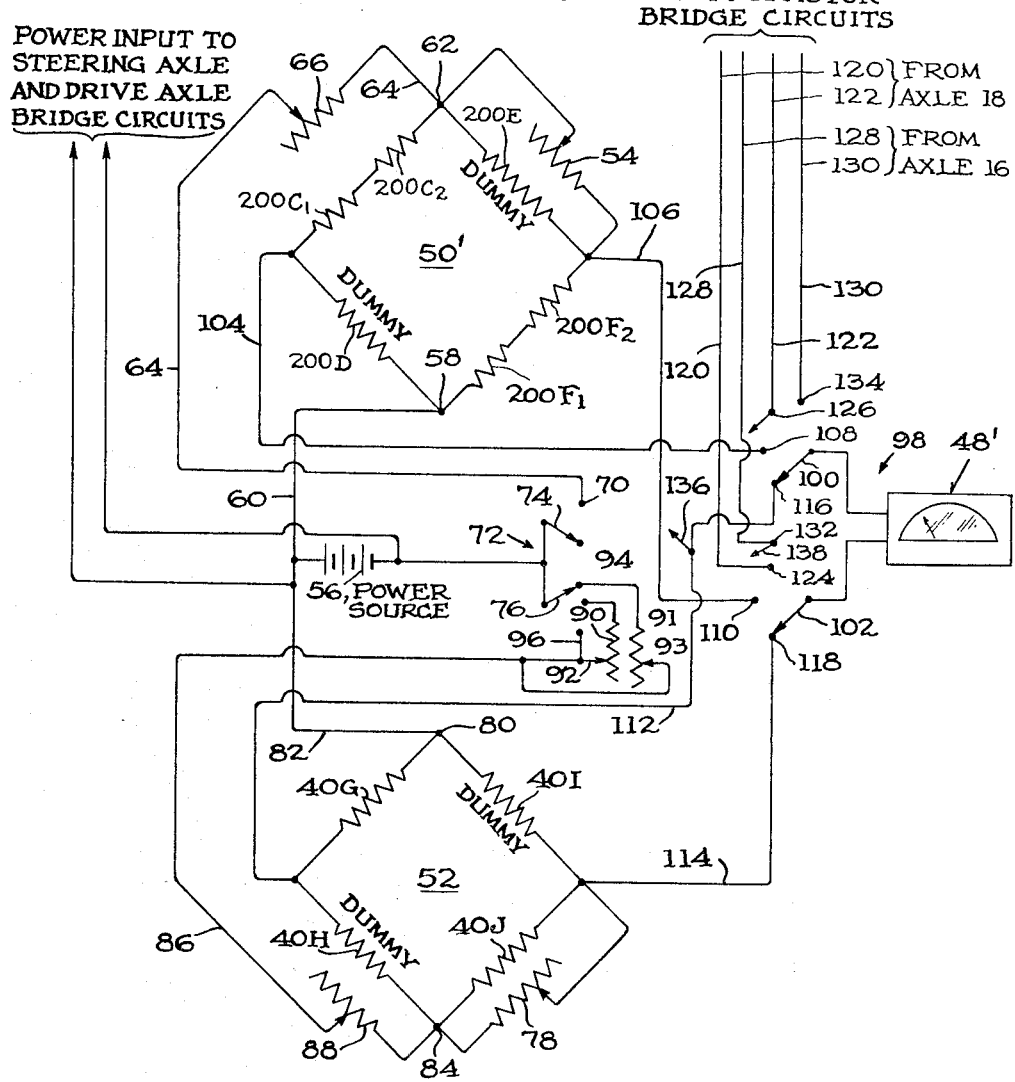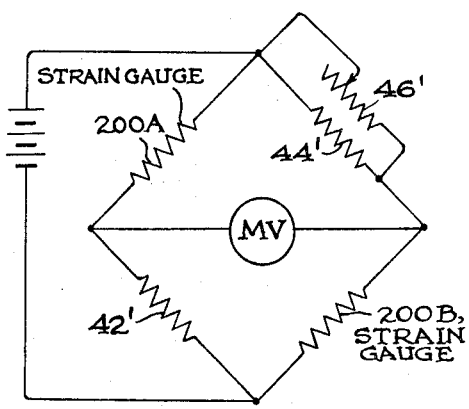

Nov. 8, 1966 D. S. FETTERMAN ET AL 3,283,838
APPARATUS AND METHOD FOR COMPUTING EQUIVALENT
WEIGHT OF TRACTOR TRAILER VEHICLE
Filed Aug. 17, 1964 6 Sheets-Sheet 6
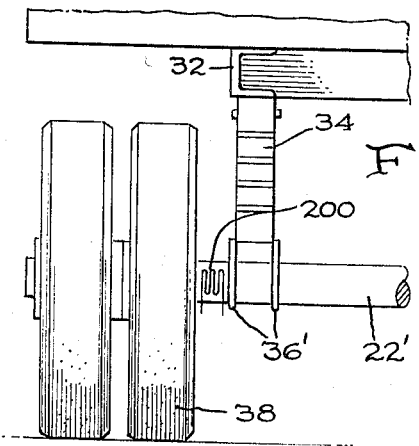
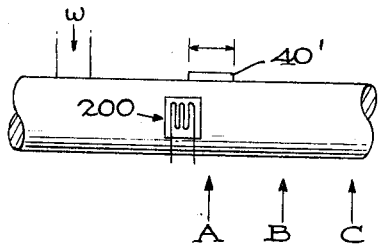
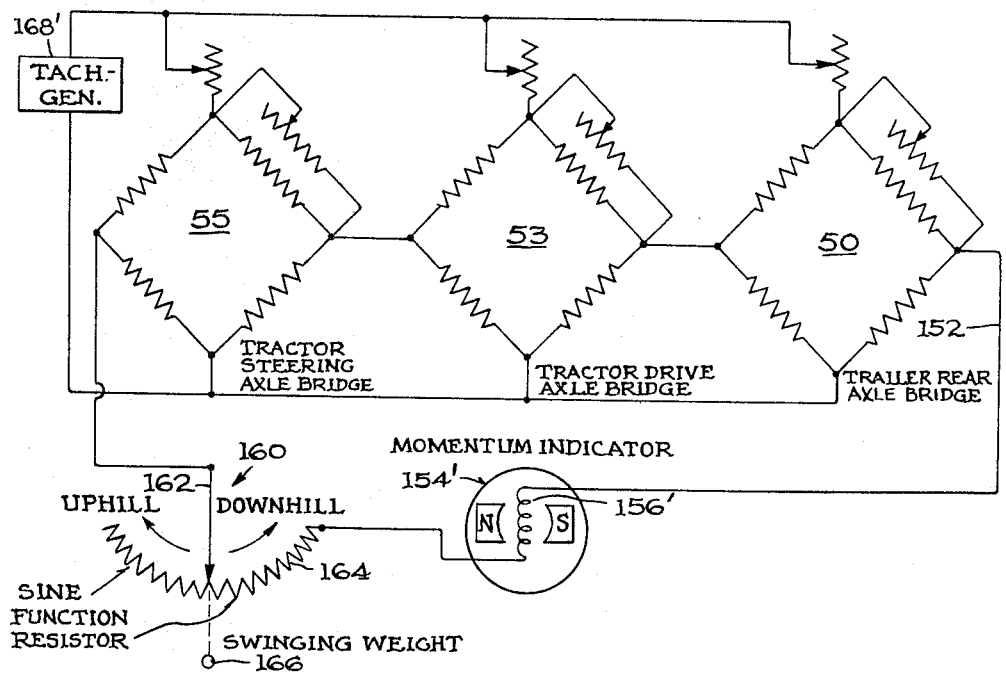
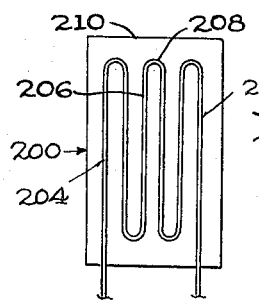
INVENTORS
DAVID S. FETTERMAN
JEROLD B. MUSKIN
BY Robert C. Sullivan
ATTORNEY

United States Patent Office 3,283,838
Patented Nov. 8, 1966

3,283,838
APPARATUS AND METHOD FOR COMPUTING EQUIVALENT WEIGHT OF TRACTOR TRAILER VEHICLE
David S. Fetterman, 1370 Bell Lane, Maple Glen, Pa., and Jerold B. Muskin, 615 Oak Shade Ave., Elkins Park, Pa.
Filed Aug. 17, 1964, Ser. No. 389,929
23 Claims. (Cl. 177—1)

This application is a continuation-in-part of our prior application Serial No. 205,654, filed June 27, 1962, and now abandoned.

This invention relates to an apparatus for and method of weighing vehicles, and more particularly to an apparatus and method which, while not restricted to such use, is particularly suitable for use in the trucking industry in measuring weights of truck tractor-trailer combinations.

In the trucking industry, it is essential that the axle and/or gross weight of a loaded truck be accurately known at all times. All states have regulations governing gross and/or axle weight of trucks. Such limitations are imposed because of safety considerations and also because of highway maintenance considerations.

The general method which is used in practice for obtaining the weight of both unloaded and loaded trucks is to drive the entire truck or a portion of the truck upon a scale at a weighing station where the weight can be observed.

It has been proposed to directly mount a weighing device on the truck or vehicle which would indicate the weight of the vehicle. However, none of the numerous devices proposed for self-contained truck weighing units has gained acceptance in the trucking industry. All devices of this type of which we are aware rely upon the deflection or strain of the springs supporting the truck body to provide an indication of the weight of the truck and/or its payload. However, spring deflection or strain as a measurement of the weight of the loaded truck is unreliable after a short period of use due to the fact that the continuous flexure of the springs causes the springs to become increasingly distorted and flaccid so that the flexion or strain of the springs for a given load does not remain constant.

Another undesirable feature of the prior art apparatus and methods for weighing payloads on truck tractor-trailers is that the prior art apparatus and methods require that the tractor and trailer be hooked together at the time the weight determination is made. Yet, in actual practice, the trailers of tractor-trailer combinations are usually loaded when the trailer is unhooked from the tractor to avoid tying up the tractor during the loading operation which frequently is quite time consuming.

In accordance with the prior art weighing methods used in the trucking industry, after the unhooked trailer has been loaded to what appears to be the desired payload, the trailer is then hooked to the tractor, and the combined tractor-trailer is moved to a weighing platform where a weighing determination is made. It frequently happens in accordance with this prior art method that the combined weight of the tractor-trailer combination either exceeds the permissible weight, or is less than the permissible weight. If the permissible weight or weight distribution is exceeded, the trailer must be partially unloaded or the weights redistributed to reduce the weight or weight distribution to the permissible value or, if the trailer is underloaded, additional load should be added to utilize the full load-carrying capacity of the trailer. In either case, the fact that the weighing operation does not occur until the unhooked trailer has been loaded and then has been hooked to its tractor renders the operation inefficient since under the prior art practice there is no known method of determining the hooked-up weight of the loaded tractor-trailer while the unhooked trailer is being loaded.

A factor which has been largely ignored in the regulation and monitoring of truck vehicles with respect to the safety of their operation is the fact that the momentum of the vehicle is an even more important safety consideration than the speed of the vehicle, since a heavily loaded truck travelling at high speed is much more potentially dangerous and harder to control than the same truck travelling unloaded or lightly loaded. Yet, as far as we know, little or no development has been done in the prior art to measure the momentum of moving vehicles such as trucks during operation, as an indication of the safety of the vehicle operation.

Accordingly, it is an object of one embodiment of this invention to provide an apparatus for weighing loaded vehicles, such as tractor-trailer combinations by weight sensing devices located directly on the vehicle, with the weight sensing devices being positioned at the optimum locations on the vehicle to provide continuously accurate load readings over the lifetime of the vehicle.

It is another object of one embodiment of this invention to provide a truck vehicle weighing apparatus and method in which the weight or load sensing devices are mounted at optimum locations on the vehicle at which maximum representative stress of the load is exerted.

It is another object of the invention to provide a truck vehicle weighing apparatus and method in which the weight or load sensing devices are mounted on a static member which does not become flaccid or distorted through use, and on a member having a life which is equal to or exceeds that of the vehicle itself.

It is another object of the invention to provide a weighing apparatus and method for measuring the payload of a tractor-trailer which permits the load on the trailer to be measured progressively as the unit is being loaded.

It is another object of the invention to provide an apparatus for and method of progressively determining the axle weights or gross weight of a tractor-trailer combination while the trailer is unhooked from the tractor and as the trailer is being loaded.

It is another object of the invention to provide a method of measuring the weight on the rear or tandem axles and on the dolly wheels of an unhooked trailer of a tractor-trailer combination and of projecting these weights to provide the axle weights or gross weight of the hooked-up tractor-trailer combination.

It is an object of another embodiment of the invention to provide a truck vehicle weighing method and apparatus in which the weighing operation is entirely independent of variations in the moment arm of the weight translation from the axle to the ground, which might be caused by such factors as changes in tire pressure, tilting of the vehicle, or even by the presence of small pebbles under the wheels.

It is still another object of the invention to provide an apparatus for and method of measuring and monitoring the momentum of a loaded truck vehicle.

In achievement of these objectives, there is provided in accordance with this invention an apparatus for and method of measuring the weight of loaded truck vehicles in accordance with which weight-sensing means, preferably resistance-type strain gauges, are preferably located on each axle of the vehicle, including the tandem axles of the trailer and the drive and front or steering axle of the tractor, and also upon the dolly wheels or dolly wheel legs of the trailer. In accordance with an important feature of one embodiment of the invention, the strain gauges on the various axles are all located on the axles between the spring hanger or spring supports and the inside surface of the adjacent wheel supported by the respective axles. The strain gauges are connected in instrumentation circuits, preferably of the Wheatstone bridge type, which are interconnected and calibrated in such manner as to permit reading the load on any individual axle or the combined load on all of the axles.

In a preferred embodiment of the invention, the strain sensing devices, preferably resistance type strain gauges, are vertically oriented on the axles so as to measure substantially only the stress of weight on the respective axles, and to eliminate any measurement of the stress of moment. The vertically oriented sensing devices thereby eliminate any errors due to variations in the moment arm of the weight translation from the axle to the ground, and measure only the shear force due to the weight on the axle.

In accordance with the method of the invention, the load on the rear or tandem axles and on the dolly wheels or dolly wheel legs of the unhooked trailer may be measured by the instrumentation circuits and the unhooked weights on these members may be mathematically and electrically projected to automatically give corresponding weight readings of the trailer tandem axles or rear trailer axle and the tractor drive axle when the tractor-trailer is hooked up.

A further feature of the invention is the provision of an apparatus which permits the weight of the filled tractor-trailer in transit to be determined anywhere, any time, with no loss in accuracy due to aging or physical changes in the vehicle-supporting springs.

A further feature of the invention is the provision of an apparatus and method in accordance with which speed and weight measurements of the truck vehicle are continuously combined to provide a continuous indication of the momentum of the moving vehicle. Means may be provided to give an indication of the maximum momentum of the vehicle over a predetermined period, or to continuously record the indicated value of momentum.

Further objects and advantages of the invention will become apparent from the following description taken in conjunction with the accompanying drawings in which:

FIG. 5 is a simplified schematic diagram of the electrical circuit connections of the strain gauges on a single axle;

FIG. 6 is a schematic wiring diagram showing the electrical circuit connections of the strain gauges of the trailer tandem axles, dolly wheels, and of the tractor axles to the indicator or read-out device;

FIG. 7a is a schematic diagram showing a possible position of the kingpin on the trailer relative to the tractor steering axle and to the rear drive axle of a tractor having a single drive axle;

FIG. 7b is a schematic diagram similar to FIG. 7a for a tractor having tandem drive axles;

FIG. 8 is a schematic view of the momentum indicating device and the electrical circuit connection therefor;

FIG. 8a is a schematic diagram showing resolution of weight components of a vehicle on an inclined highway;

FIG. 13 is a simplified schematic diagram of the electrical circuit connections of vertically oriented strain gauges on a single axle;

FIG. 14 is a schematic wiring diagram showing the electrical circuit connections of the vertically oriented strain gauges on the trailer tandem axles and the dolly wheels and tractor axles to the indicator or read-out device;

FIG. 15 is a view in vertical elevation, partially broken away, showing a vertically oriented strain gauge on the trailer axle;

FIG. 16 is a schematic diagram used to explain the effect of changing the point of application of the reaction force on the axle, to thereby change the moment arm of the weight translation from the axle to the ground;

FIG. 17 is a schematic view of the momentum indicating device and of the electrical circuit connections therefor, modified to use the tachometer generator as the power supply for the bridge circuit; and FIG. 18 is an enlarged view of a bonded wire strain gauge which may be used for load measurement on the vehicle.

Figure 1:
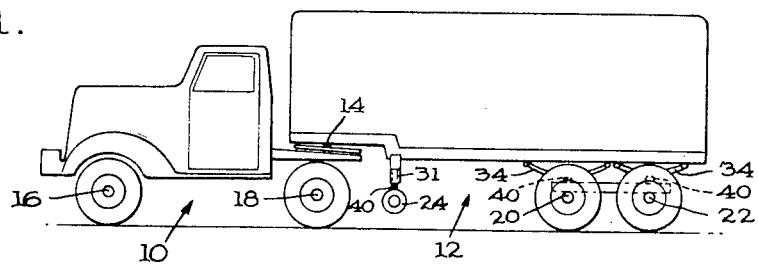
FIG. 1 is a schematic view in side elevation of a tractor-trailer combination with the trailer hooked to the tractor.

Referring now to the drawings, there is shown in FIG. 1 a tractor-trailer combination, including a tractor 10 and a trailer 12, with the trailer being connected to the tractor by a kingpin 14 lying in the same vertical plane as the axis of the rear drive wheels of the tractor, or in a closely adjacent vertical plane, as is well known in the art.

The tractor 10 includes a front or steering axle 16, and a rear or drive axle 18, while the trailer 12 is supported adjacent the rear thereof by tandem axles 20 and 22. The two tandem axles 20 and 22 are mounted for sliding movement together longitudinally of the trailer body and may be longitudinally adjustable, for example, by as much as 12 feet on a trailer 40 feet in length. The two tandem axles 20 and 22 always remain a fixed distance apart from each other. On smaller trailers, a single rear axle may be provided instead of the two tandem axles 20 and 22.

Figure 2A:
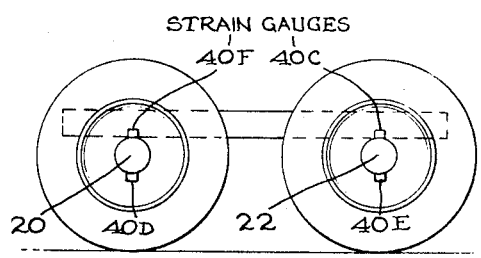
FIG. 2a is an enlarged view in side elevation showing the location of the weight-sensing strain gauges on the tandem axles of the trailer.
Figure 2:
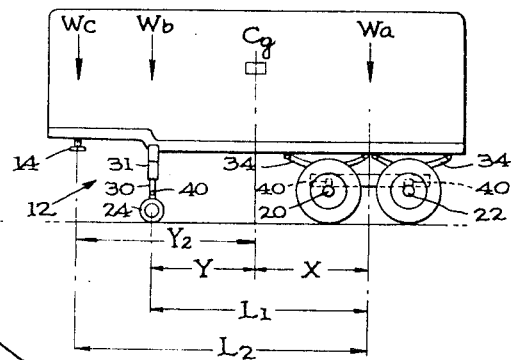
FIG. 2 is a schematic view in side elevation showing the trailer of FIG. 1 unhooked from the tractor and with the dolly wheels of the trailer lowered.
Figure 4A:
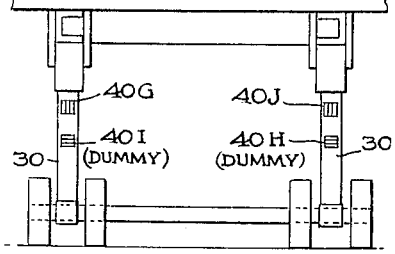
FIG. 4a is a diagrammatic view showing the placement of the active and inactive dummy strain gauges on the dolly wheel legs.
Figure 4:
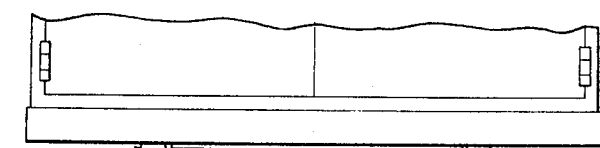
FIG. 4 is a front elevation view, partially cut away, showing the location of the strain gauges on the dolly wheel legs of the trailer of FIG. 2.

As best seen in FIGS. 2 and 4, when the trailer 12 is unhooked from the tractor 10, it is supported by means of dolly wheels 24 mounted on a dolly wheel axle 26 which, in turn, is supported by bearings 28 at the lower ends of dolly wheel legs 30. The dolly wheel legs 30 are telescopically movable in cylindrical housings 31 supported by the underbody of the trailer. The dolly wheel legs 30 are moved downwardly out of the housings 30 by means of a suitable gearing mechanism which may be operated by manually rotating a crank.

In accordance with the invention, means are provided for measuring the weights on any of the individual axles of the tractor 10 or trailer 12, or on the dolly wheel legs 30, or for measuring the unhooked weight of the trailer, or the hooked-up weight of the tractor-trailer, as required.

Figure 3:
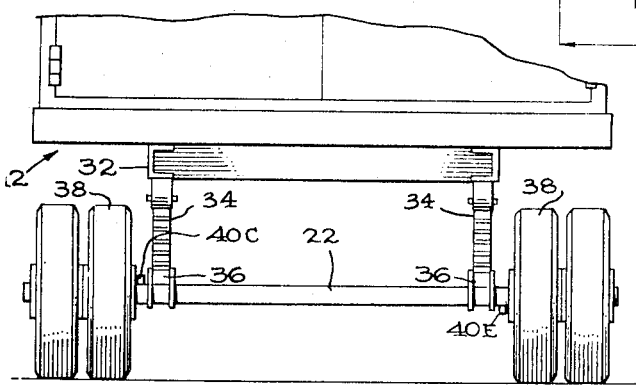
FIG. 3 is a view in rear elevation, partially cut away, showing the location of the strain gauge weight sensing devices on one of the tandem axles of the trailer.

Referring to FIG. 3, the body of trailer 12 is mounted on a supporting framework 32 which forms part of the trailer chassis. Leaf springs or other suitable springs 34 extend between the chassis framework 32 and the spring hangers 36 which are positioned adjacent but spaced from the innermost surface of the wheels 38 at each of the opposite ends of the two tandem axles 20–22. The spring hangers 36 are suitably secured to the axle or axle housing and in turn suitably secure the leaf springs 34 to the axle or axle housing. Spring hangers 36 may assume any form commonly used for this purpose. In accordance with an important feature of this embodiment of the invention, strain gauges 40 which are preferably of the resistance type, are positioned on and are glued or otherwise suitably attached to each of the tandem axles 20–22 between the spring hangers 36 and the innermost surface of the adjacent wheel 38 at the corresponding end of axle 22. Strain gauges 40 are similarly positioned on the front or steering axle 16 and on the rear drive axle 18 of the tractor 10. The strain gauges 40 may be positioned on the upper or lower surface of the axle and at each of the opposite ends of the axle.

The strain gauges 40 positioned on the vehicle axles, such as strain gauges 40A, 40B, 40C, 40D, 40E, and 40F are assumed in the embodiment shown in FIGS. 1–6 to be positioned on the upper or lower surfaces of the axles, as specified elsewhere in the specification, with the strain sensing element of the gauge extending in a substantially horizontal plane on the respective upper or lower axle surface on which it is positioned and aligned in a direction parallel to the longitudinal axis of the axle. However, as explained in connection with the embodiment of FIGS. 13–17, it is preferred to orient the strain gauges vertically on a vertical surface of the axle with the strain sensing element being oriented normal or perpendicular to the longitudinal axis of the axle.

By experimentation, it has been observed that under static loading conditions the portion of the axle or axle housing between the spring hangers 36 and the innermost surface of the wheel reflects the highest and most reliable weight-to-strain ratio, whereas placement of strain gauges at points between the opposite spring hangers 36 on a given axle results in a negligible signal from the strain gauge. Measurement of the strain produced by the weight of the payload on the axle is vastly superior to measurement of the strain produced on the spring because of several different factors, including the following:

(1) Under static loading conditions, maximum representative stress of the load is exerted on the axle between the spring hanger and the innermost face on the adjacent wheel;

(2) The axle is a static member which does not become flacid or distorted through use;

(3) The life of the axle or axle housing is equivalent to or exceeds that of the vehicle itself;

(4) Axle weight, which is the ultimate value to be determined, can be reflected most truly by the axle or axle housing as these are the only members which are strained only by the weight.

In some instances, particularly in the case of the rear or tandem axle of the trailer and the front steering axle of the tractor, the strain gauges are mounted directly on the axle, while in other instances, particularly in the case of the drive axles of the tractor, the strain gauges are mounted on the axle housing within which the axles are mounted for rotation. The term "axle member" or "axle means" used in the claims is intended to cover any stationary axle member upon which the strain gauges are mounted, including stationary axles, such as the tandem axles of the trailer, or the steering axle of the tractor, or a stationary axle housing, such as the axle housing for the tractor drive axle.

There is shown in FIG. 5 a simplified circuit diagram of a Wheatstone bridge circuit which may be used to measure the load on any given axle, as, for example, a single rear axle of a trailer having only one rear axle. The circuit of FIG. 5 includes the bridge arms 40A, 42, 44, and 40B. Arms 40A and 40B of the bridge are resistance strain gauges positioned at opposite ends of the axle on which the weight is being measured. Strain gauges 40A and 40B are both positioned on the same corresponding surface of the axle, either the upper or lower surface. Resistance 42 is in series with strain gauge 40A to complete one side of the Wheatstone bridge, while resistance 44 is in series with strain gauge 40B to complete the other side of the bridge. A zero calibrating resistance 46 is positioned in parallel relation to resistance 44 to balance the bridge to zero and to adjust for the unladen weight of the vehicle. A millivoltmeter 48 is positioned across the bridge in the conventional manner of Wheatstone bridges, between the strain gauge 40A and the resistance 42 on one side of the bridge, and between the parallel-connected resistance 44–46 and the strain gauge 40B on the opposite side of the bridge.

The millivoltmeter 48 of FIG. 5 may be calibrated in terms of weight by first balancing the bridge for zero payload and then progressively adding known weights at the center of the distance between the tandem axle of the trailer and the dolly wheel legs of the trailer, assuming that the trailer is unhooked and is supported at the forward end thereof by the dolly wheel legs. Under these conditions, half of the known weight will fall on the tandem axle and half on the dolly wheel legs. Thus, if the millivoltmeter which is being calibrated is connected to the bridge circuit of the tandem axle, for example, it is known that the weights which produce the given deflections of the millivoltmeter 48 are respectively equal to one-half of the centrally located progressively increased known weights. Thus, the deflections corresponding to the known weights permit calibration of the millivoltmeter 48.

In the bridge circuit of FIG. 5, if the resistance values of strain gauge 40A and resistance 44 are equal to each other, and if the resistance values of strain gauge 40B and resistance 42 were equal to each other, the bridge would be balanced at zero payload without the necessity of using balancing resistance 46. However, as a practical matter, the resistance values of strain gauges and resistors used in the Wheatstone bridge are never precisely equal and it is therefore necessary to adjust the zero calibrating resistance 46 to balance the bridge to provide a zero reading on millivoltmeter 48 at zero payload.

When the strain gauges 40A and 40B are placed on the axle, the axle is already strained due to the unladen weight of the vehicle (either the trailer or tractor depending upon which axle the strain gauges are positioned on). Hence, the unladen weight of the vehicle does not cause an unbalance of the bridge to produce a reading on millivoltmeter 48.

If it is desired to obtain a reading of the gross weight of the vehicle, including payload plus unladen vehicle weight, the component of unladen vehicle weight on any particular axle, which can be obtained from the manufacturer's specifications, can be added electrically to the output of the bridge of FIG. 5 by unbalancing the bridge by means of adjustable resistance 46 to provide a reading on meter 48 corresponding to the component of unladen vehicle weight on the given axle. Thus, the bridge will have a reading at zero payload corresponding to the component of unladen weight on the corresponding axle. Addition of payload will then further unbalance the bridge, the total reading of meter 48 corresponding to the component of gross weight on the respective axle.

Figure 9:
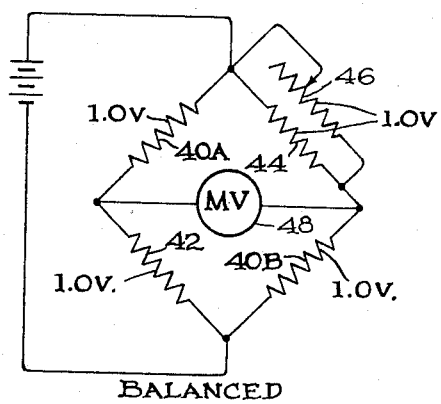
FIG. 9 is a schematic illustration of the Wheatstone bridge of FIG. 5 assuming that the bridge is balanced and that there is no load on the axle being measured.
Figure 10:
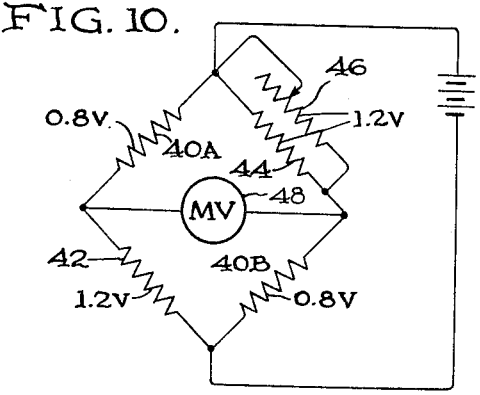
FIG. 10 is a schematic illustration of the Wheatstone bridge of FIG. 5 assuming that a load has been placed upon the vehicle which causes a component of weight on the axle being measured to thereby produce a change in the resistance of the strain gauges in the bridge.

In explaining the operation of the Wheatstone bridge of FIG. 5 for measuring load on the vehicle, reference is made to FIGS. 9 and 10. The battery voltage has been assumed to be 2.0 volts for sake of illustration and it is assumed that equal voltage drops occur across strain gauges 40A and 40B and also across resistance 42 and across the combined resistance 44–46. Therefore, as indicated in FIG. 9, which is a reproduction of FIG. 5 assuming that the bridge is balanced and that there is no load on the axle being measured, it is assumed that there is a voltage drop of 1.0 volt across each of the legs of the bridge, namely, across strain gauge 40A, across resistance 42, across combined resistance 44–46 and across strain gauge 40B. In this condition, the opposite terminals of the millivoltmeter 48 are connected across points of equal potential and there is no current flow through the millivoltmeter and hence no indication on the meter.

Referring now to FIG. 10, assume that a load has been placed upon the vehicle which causes a component of weight on the axle being measured to thereby produce a change in the resistance of the two strain gauges 40A and 40B. It was previously stated in the specification that the strain gauges 40A and 40B are positioned at opposite ends of the axle and on the same corresponding surface thereof—that is, that both of the strain gauges 40A and 40B are either on the top surface or on the bottom surface of the axle. If it is assumed that the two strain gauges are on the top surface of the axle, then each of the strain gauges 40A and 40B would be in compression, and, as is well known in the strain gauge art, resistance type strain gauges under compression decrease in resistance with increase of the compression load. Hence it can be assumed that each of the strain gauges 40A and 40B decreases equally in resistance so that the voltage drop across each of the strain gauges 40A and 40B drops to a value such as 0.8 volt, for example, as indicated in FIG. 10. Since the battery voltage remains constant at all times, the voltage drop across resistance 42 in series with strain gauge 40A will increase to 1.2 volts and the voltage across the combined resistance 44–46 in series with strain gauge 40B will increase to 1.2 volts. Hence, it can be seen from an inspection of the diagram of FIG. 10 that the left hand side of the millivoltmeter, with respect to the view shown in FIG. 10, connected at the junction of strain gauge 40A and resistance 42, is connected at a point which has dropped 0.8 volt with respect to the positive terminal of the battery, while the right hand terminal of the millivoltmeter which is connected at the junction of resistance 44–46 and strain gauge 40B is connected at a point which has dropped 1.2 volts from the positive terminal of the battery. Therefore, the opposite ends of the millivoltmeter are connected at points of different potential, and there is a current flow through the millivoltmeter and hence an indication of the load on the axle.

A Wheatstone bridge similar to that shown in FIG. 5 may be provided for each of the axles. Normally, a single Wheatstone bridge will suffice for the two tandem axles 20–22, as will be explained more fully in connection with the circuit diagram of FIG. 6. The Wheatstone bridge circuit similar to that of FIG. 5 provided for each of the axles 16, 18, or 20–22 may be selectively connected to a common read-out device or millivoltmeter to permit the same read-out device or millivoltmeter to be used to detect the degree of unbalance of any one of the bridges, and thus of the weight on the corresponding axle. Also, the plurality of bridges associated with the plurality of axles 16, 18, and 20–22 may have their output voltages connected in series with each other to provide a cumulative or summation reading indicative of the total weight on all of the axles 16, 18, and 20–22, to thereby give the total weight of the hooked-up tractor-trailer.

It is important, of course, that the Wheatstone bridges for all of the axles and for the dolly wheel legs be calibrated and adjusted so that with the normal supply voltage to the respective bridges the output or unbalance voltage for the respective bridges is the same for a given weight.

*Projection of weight readings with trailer unhooked to obtain equivalent weight readings of hooked-up tractor-trailer*

As has been mentioned hereinbefore, an important feature of the invention is the method of projecting the weight readings of the unhooked trailer to give corresponding weight readings of the hooked-up tractor-trailer. This permits weight readings of the unhooked trailer taken as the trailer is being progressively loaded at a loading platform to be projected to give corresponding weight readings with the same load when the trailer is hooked to the tractor.

The projection of the unhooked trailer weight readings to give the hooked tractor-trailer weight readings is based upon the mathematical relation indicated by the following equation:

$$W_c = \frac{L_1}{L_2}(W_b)$$

In the equation just given and in the equations which follow, the following is a key to the mathematical expressions used:

$W_a$ is the weight with the trailer *unhooked* acting on an axis centrally located between the two tandem axles 20–22 when the trailer has tandem axles or on the single rear axle of the trailer when the trailer has only a single rear axle;

$W_{a2}$ is the weight with the trailer *hooked* acting on an axis centrally located between the two tandem axles 20–22 or on the single rear axle of the trailer;

$W$ is the weight of the loaded trailer;

$W_b$ is the wieght with the trailer unhooked acting along the vertical axis of the dolly wheel legs of the trailer;

$W_c$ is the weight acting in the vertical plane of the kingpin 14 of the trailer;

$W_d$ is the weight acting on the rear tractor drive axle of the hooked-up tractor-trailer;

$W_f$ is the weight acting on the front tractor axle of the hooked-up tractor-trailer;

$L_1$ is the horizontal distance from the axis centrally located between the two tandem axles 20–22 or from the single rear axle of the trailer to the vertical axis of the dolly wheel means;

$L_2$ is the horizontal distance from an axis centrally located between the two tandem axles 20–22 or from the single rear axle of the trailer to the kingpin 14 of the trailer;

$X$ is the horizontal distance from the center of gravity $C_g$ of the loaded trailer to the axis centrally located between the two tandem axles 20–22 or to the single rear axle of the trailer;

$Y_1$ is the horizontal distance from the center of gravity $C_g$ of the loaded trailer to the vertical axis of the dolly wheel legs;

$Y_2$ is the horizontal distance from the center of gravity $C_g$ of the loaded trailer to the vertical axis of kingpin 14 of the trailer.

The following is a derivation of the equation $$W_c = \frac{L_1}{L_2}(W_b)$$

(1) Taking moments about the center of gravity $C_g$ of the *unhooked* trailer gives the following equation:

$$X(W_a) = Y_1 W_b$$

(2) Taking moments about the center of gravity of the *hooked* trailer gives the following equation:

$$X(W_{a2}) = Y_2 W_c$$

(3) With the trailer unhooked:

$$W_a + W_b = W$$

(4) With the trailer hooked:

$$W_{a2} + W_c = W$$

(5) $\quad X + Y_1 = L_1$ (6) $\quad X + Y_2 = L_2$

Rearranging (5) gives:

(7) $\quad Y_1 = (L_1 - X)$ and substituting for $Y_1$ in (1) gives:

(8) $\quad X(W_a) = (L_1 - X)(W_b)$
$\quad\quad\quad\quad = L_1 W_b - X W_b$

Rearranging (8) gives:

(9) $\quad X(W_a + W_b) = L_1 W_b$

Substituting from Equation 3 gives:

(10) $\quad X W = L_1 W_b$ or

(11) $\quad X = \dfrac{L_1 W_b}{W}$

Operating on Equation 2 in a manner similar to the operation on Equation 1:

(12) Rearrange (6) to get:

$$Y_2 = L_2 - X$$

and substituting in (2) gives:

(13) $\quad X(W_{a2}) = (L_2 - X)(W_c)$
$\quad\quad\quad\quad = L_2 W_c - X W_c$

(14) Rearranging (13) gives:

$$X(W_{a2} + W_c) = L_2 W_c$$

(15) Substituting (4) into (14) gives:

$$X W = L_2 W_c$$

or

(16) $\quad X = \dfrac{L_2 W_c}{W}$

(17) Equating steps (11) and (16) gives:

(18) $\quad X = X$ or $$\dfrac{L_1 W_b}{W} = \dfrac{L_2 W_c}{W}$$

(19) Cancelling $W$ from (18) and rearranging gives:

$$W_c = \dfrac{L_1}{L_2} W_b$$

As will be explained more fully hereinafter, Equation 19 may be solved for $W_c$ by multiplying the normal voltage input for Wheatstone bridge 52 which measures $W_b$ by the weight transfer ratio $L_1/L_2$. Since the calibration of the bridge is based on a normal supply voltage, multiplication of the normal voltage supply to bridge 52 by any desired weight transfer ratio will correspondingly multiply the readings of the bridge. The mathematical ratio $L_1/L_2$ which when multiplied as a factor against $W_b$ produces $W_c$ may be regarded as a "weight transfer ratio" since its effect is to transfer a weight at a given point, such as the dolly wheels, into an equivalent weight at another point, such as the kingpin, based upon the law of moments and the relative distances of the various points from the center of gravity of the vehicle.

*Obtaining projected value of hooked-up tandem axle weight from unhooked trailer weight readings*

Having obtained $W_c$, the projected weight of the hooked-up trailer acting in line with kingpin 14, and also having obtained the total weight $W$ by the sum of the readings of the tandem axle and dolly wheel bridges 50 and 52, respectively, based on Equation 3:

$$(W = W_a + W_b)$$

the determination of $W_{a2}$, the projected hooked-up weight acting on the tandem axles, then becomes a matter which can be solved by pencil-and-paper arithmetic based on the following equation for the hooked-up trailer:

$$W = W_{a2} + W_c \quad \text{(Equation 4)}$$

or $$W_{a2} = W - W_c \quad \text{(Equation 4A)}$$

For example, assume that with the trailer unhooked, the readings of $W_a$ and $W_b$ were each 6,000 pounds. Then, the total weight of the loaded trailer $$= W = W_a + W_b$$
$$= 6{,}000 \text{ pounds} + 6{,}000 \text{ pounds}$$
$$= 12{,}000 \text{ pounds}$$

Also, assume that the relative locations of the rear or tandem axles of the trailer, the dolly wheels, and the kingpin are such that $$\dfrac{L_1}{L_2} = \dfrac{20}{26}$$

Then, $$W_c = \dfrac{20}{26}(6{,}000) = 4{,}615 \text{ pounds}$$

Therefore, $W_{a2}$, the projected hooked-up weight on tandem axles $20$–$22 = W - W_c = 12{,}000 - 4{,}615 = 7{,}385$ pounds.

The foregoing computation is based directly on readings obtained from the read-out device 48' of FIG. 6. Thus, the value of $W$ may be obtained as a direct reading by the summation of the output voltages of bridges 50 and 52. Also, $W_c$ may be obtained as a direct reading on read-out device 48' by reading the output of dolly wheel bridge 52 with the $L_1/L_2$ ratio resistance 90 connected in the input circuit of bridge 52. With readings of $W$ and $W_c$, the solution of Equation 4A to obtain $W_{a2}$ is a matter of simple pencil-and-paper arithmetic.

It is also possible to get a direct reading on readout device 48' of the projected hooked-up tandem axle weight based on readings taken when the trailer is unhooked from the tractor, based upon the following mathematical relation:

(20) $\quad W_{a2} = W_a + \dfrac{L_2 - L_1}{L_2}(W_b)$

The values of $L_1$ and $L_2$ are fixed for any given trailer, while $W_a$ and $W_b$, the unhooked weight readings on the tandem axles and on the dolly wheel legs, can be obtained by the circuits of FIG. 6.

The equation for $W_{a2}$ is derived as follows—Rearranging Equation 4 gives the following:

(21) $\quad W_{a2} = W - W_c$

Substituting Equation 19 into 21 gives:

(22) $\quad W_{a2} = W - \dfrac{L_1}{L_2} W_b$ $\quad\quad W = W_a + W_b \quad$ (Equation 3)

Substituting 3 into 22 gives:

(23) $\quad W_{a2} = W_a + W_b - \dfrac{L_1}{L_2}(W_b)$

Rearranging 23 gives:

(24) $\quad W_{a2} = W_a + \dfrac{L_2 W_b - L_1 W_b}{L_2}$

Rearranging 24 gives:

(25) $\quad W_{a2} = W_a + \dfrac{(L_2 - L_1)}{L_2}(W_b)$

As will be explained in more detail hereinafter, a ratio resistance 91 may be connected into the input power supply circuit of dolly wheel bridge 52 which will multiply the output voltage of that bridge to provide the term $$\dfrac{L_2 - L_1}{L_2}(W_b)$$

Equation 25 may then be satisfied by connecting the output of bridge 52 multiplied as just described in series with the voltage output of bridge 50. The summation of the voltages of bridges 50 and 52 will equal $W_{a2}$, the projected tandem axle weight of the hooked-up trailer based on the unhooked weight readings of the trailer.

Description of electrical circuitry of FIG. 6

The circuit arrangement shown in FIG. 6 permits the weight of the unhooked trailer to be projected into the equivalent weight readings of the hooked-up tractor trailer, as will now be described. The circuitry of FIG. 6 also permits readings to be taken of the weights on the individual axles, and also of the total weight of the unhooked trailer, as well as the weight of the hooked-up tractor trailer.

Referring now to FIG. 6, there is shown a Wheatstone bridge generally indicated at 50 for the strain gauges on the tandem axles 20–22, and a Wheatstone bridge generally indicated at 52 for the strain gauges on the dolly wheel legs 30.

Wheatstone bridge 50 for the tandem axles includes on one side thereof the series-connected strain gauges 40C and 40D which are respectively positioned on the left top surface of the rear tandem axle 22 and on the left bottom surface of the front tandem axle 20. The opposite side of Wheatstone bridge 50 includes the series-connected strain gauges 40E and 40F which are respectively mounted on the right bottom surface of rear tandem axle 22 and on the right top surface of front tandem axle 20. A zero adjusting resistance 54 for bridge 50 is connected in parallel with strain gauge 40E of the bridge.

A direct current power supply for both bridges 50 and 52 is indicated at 56 and the input terminal 58 of bridge 50 between strain gauges 40D and 40F is connected by conductor 60 to one side of power supply 56. The opposite power input terminal 62 of bridge 50 between strain gauges 40C and 40E is connected by conductor 64 in series with an adjustable calibrating resistance 66 to terminal 70 of a selector switch generally indicated at 72. Selector switch 70 includes two poles or movable contacts 74 and 76.

The reason for locating some of the strain gauges of bridge 50 on the top surface and some on the bottom surface of the axle can be stated as follows: As is well known in the strain gauge art, strain gauges which are positioned on the top surface of the member to which a force is applied, such as the axles of the present invention, are subjected to a compression load and hence decrease in resistance with increase in the compression load. On the other hand, strain gauges which are positioned on the underneath surface of an axle are subjected to a tension load and increase in resistance with increase in load. By placing strain gauges on both the upper and lower surfaces of the tandem axles as previously described, both compression and tension readings are obtained on the strain gauges which tend to provide a more representative and more accurate reading of the strain on the axles and hence a more accurate and sensitive evaluation of the load imposed on the axle. Furthermore, by using strain gauges in all of the arms of the Wheatstone bridge 50 as shown in the diagram of FIG. 6, rather than using several ordinary resistances as shown in the basic diagram of FIG. 5, and with all of the strain gauges being actually positioned on the axles and subjected to the ambient temperature of the axles, the bridge becomes automatically self-compensating for any variations in ambient temperature, since all of the legs of the bridge are equally affected by any such temperature changes. On the other hand, if strain gauges are positioned on only two of the legs of the bridge, as for example, in basic circuit of FIG. 5, and the resistances of the other two arms are not compensated for changes in environmental temperature, there may be a slight inaccuracy in the bridge due to the lack of temperature compensation. On the other hand, the bridge 50 of FIG. 6 is automatically self-compensating for ambient temperature variations due to the fact that strain gauges are located in all of the arms of the bridge.

Figure 11:
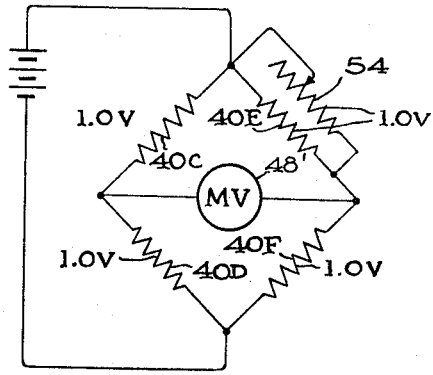
FIG. 11 is a schematic illustration of the Wheatstone bridge 50 of FIG. 6 when the bridge is balanced and there is no load on the axle being measured.
Figure 12:
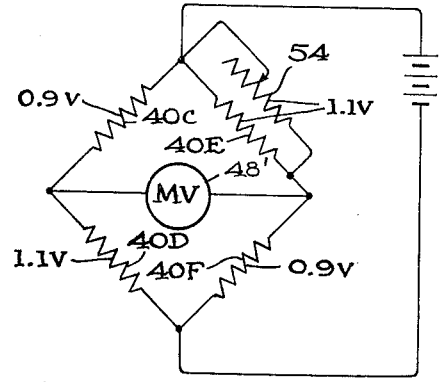
FIG. 12 is a schematic illustration of the Wheatstone bridge 50 of FIG. 6 assuming that a load has been placed upon the vehicle which causes a component of weight on the axle being measured to thereby produce a change in the resistance of the strain gauges in the bridge.

Reference is now made to FIGS. 11 and 12 for an explanation of the operation of the bridge 50 of FIG. 6. Referring first to FIG. 11 which shows the balanced condition of the bridge 50 when there is no load on the axle being measured: it will be assumed that the supply voltage is 2.0 volts and that in the balanced condition of the bridge there is a 1.0 volt drop across each of the arms of bridge 50, namely, across the strain gauges 40C, 40D, 40E and 40F. For purposes of this explanation, the balancing effect of resistance 54 is not considered a significant factor. Hence, with equal voltage drops across each of the arms of the balanced bridge in FIG. 11, the opposite ends of the millivoltmeter are connected across points of equal potential and hence there is no current flow through the meter and no indication by the meter of any load on tandem axles 20–22.

Consider now the condition which prevails where there is a load on the rear tandem axles 20–22, as shown in FIG. 12. Since strain gauge 40C is defined as being located on the left top surface of the rear tandem axle 22, gauge 40C will be in compression and will decrease in resistance under load. Hence it will be assumed that the voltage drop across strain gauge 40C will drop to 0.9 volt. Also, since strain gauge 40D has been described as being on the left bottom surface of the front tandem axle 20, this strain gauge will be in tension and hence its resistance will increase so that the voltage drop across strain gauge 40D may be assumed to have increased to 1.1 volts. Similarly, on the opposite side of the bridge, strain gauge 40E which has been described as being located on the right bottom surface of the rear tandem axle 22, will be in tension, and hence its resistance will have increased under load so that the voltage drop across strain gauge 40E may be assumed to have increased to 1.1 volts. The strain gauge 40F has been described as being located on the right top surface of the front tandem axle 20 and hence is under compression when the axle is loaded. Thus, the resistance of strain gauge 40F will decrease under the compression load to which it is subjected and the voltage drop across strain gauge 40F may be assumed to have decreased to 0.9 volt. Thus, it will be seen that when the tandem axles 20—22 are under load as just described, the points on the bridge 50 to which the conductors 104 and 106 which lead to the meter 48′ are connected are at different potentials and hence there will be a current flow through the meter indicative of the load on tandem axles 20 and 22.

The Wheatstone bridge 52 for the dolly wheel legs 30 includes the series-connected strain gauges 40G and 40H on one side of the bridge, these two strain gauges being respectively connected to the left and right dolly wheel legs 30. The opposite side of bridge 52 includes the series-connected strain gauges 40I and 40J which are respectively connected to the left and right dolly wheel legs 30. Strain gauges 40H and 40I are "dummies" or inactive and do not change resistance value in accordance with load changes on the dolly wheel legs. Gauges 40H and 40I may be made inactive by placing these gauges with their longitudinal axes and the longitudinal axis of the strain sensing element, such as the connected "hairpins" 204 of FIG. 18, transverse to the vertical axis of the dolly wheel legs, shown in FIG. 4a, as would be apparent to a person skilled in the art. Active strain gauges 40G and 40J, as seen in FIG. 4a are positioned with their longitudinal axes and the longitudinal axis of the strain sensing element, parallel to the vertical axis of the dolly wheel legs. Since strain gauges 40H and 40I are inactive and are not used as strain gauges, they may be replaced by ordinary resistance if desired. A zero adjusting resistance 78 is connected in parallel with strain gauge 40J. One side of the power supply 56 is directly connected by conductor 82 to input terminal 80 of bridge 52, while the opposite input terminal 84 of bridge 52 is connected by conductor 86 in series with adjustable calibrating resistance 88 to the slidable adjusting tap 92 of variable resistor 90, and also to the slidable adjusting tap 93 of variable resistor 91. One end of the variable resistor 90 is connected to terminal 94 of selector switch 72 where it may be engaged by movable contact 76 of the selector switch 72 to complete the connection of bridge 52 to power supply 56. Similarly, one end of variable resistor 91 is connected to terminal 95 of selector switch 72 where it may be engaged by movable contact 76 of selector switch 72 to provide an alternative connection of bridge 52 to power supply 56 when a reading is being taken of the projected tandem axle weight of the hooked-up trailer based upon the unhooked weight readings of the trailer.

Variable resistor 90 may be included in the circuit from voltage supply 56 to input terminal 84 of bridge 52 by moving selector switch contact 76 into engagement with terminal 94 of selector switch 72 to provide a voltage input to dolly wheel bridge 52 such that the output voltage of the bridge satisfies the equation $$W_c = \frac{L_1}{L_2}(W_b)$$

when the circuit is being used to project the weight of the unhooked trailer to give the weight $W_c$ on the rear drive axle 18 of the hooked-up tractor trailer. Since the bridge 52 gives the weight $W_b$ on the dolly wheel legs 30 as indicated by the diagram of FIG. 2, adjustment of the input voltage to bridge 52 in accordance with the ratio $L_1/L_2$ will cause the deflection or output voltage due to unbalance of the bridge 52 to be changed by the same ratio so that the output voltage of the bridge gives the projected weight at the kingpin of the trailer based on the unhooked weight on the dolly wheel legs. In projecting the weight $W_b$ on the dolly wheel legs to get the weight $W_c$ at the kingpin, in accordance with the equation $$W_c = \frac{L_1}{L_2}(W_b)$$

the adjustable resistance 78 of dolly wheel bridge 52 should be adjusted to provide a bridge unbalance sufficient to give a reading on meter 48′ of the component of unladen trailer weight at the kingpin 14. This component of unladen weight at the kingpin is a constant value which can be obtained from or calculated on the basis of the manufacturer's specification relating to the unladen weight of the trailer and the location of the tandem axle relative to the center of gravity of the unladen trailer.

Variable resistor 91 may be included in the circuit from voltage supply 56 to input terminal 84 of bridge 52 by moving selector switch contact 76 into engagement with terminal 95 of switch 72 to provide a voltage input to dolly wheel bridge 52 such that the voltage input to bridge 52 is multiplied by the ratio $$\frac{L_2 - L_1}{L_2}$$

As indicated by Equation 25, in order to get the projected hooked-up trailer tandem axle weight $W_{a2}$, it is necessary to satisfy the equation:

$$W_{a2} = W_a + \frac{L_2 - L_1}{L_2}(W_b)$$

Therefore, to obtain the projected value of the trailer tandem axle weight for the hooked-up trailer, based on the unhooked trailer weight readings, it is necessary to serially connect the output voltages of bridge 50 and of bridge 52, with the input voltage of dolly wheel bridge 52 being connected in series with variable resistor 91, so that the input voltage to bridge 52 is multiplied by the ratio $$\frac{L_2 - L_1}{L_2}$$

The summation of the two output voltages of bridges 50 and 52 under these conditions as read upon read-out device 48′ will then give the projected value of $W_{a2}$, the projected hooked-up weight on the rear axle or tandem axles of the trailer. In projecting the weight on the dolly wheel legs to get the projected hooked-up trailer tandem axle weight in accordance with the equation $$W_{a2} = W_a + \frac{L_2 - L_1}{L_2}(W_b)$$

the adjustable resistance 78 of dolly wheel bridge 52 should be adjusted to provide a bridge unbalance sufficient to give a reading on meter 48′ of the unladen trailer weight at the center line of the tandem axles 20–22. This component can be calculated on the basis of manufacturer's specifications relating to the unladen weight of the trailer and the location of the tandem axle relative to the center of gravity of the unladen trailer.

Terminal 84 of dolly wheel strain bridge 52 is also connected to a terminal 96 of selector switch 72 which may be engaged by movable contact 76 of selector switch 72 to permit by-passing of both of the adjustable resistors 90 and 91 when it is not desired to multiply the output of bridge 52 by either the ratio $$\frac{L_1}{L_2} \text{ or } \frac{L_2 - L_1}{L_2}$$

Instead of providing two ratio resistors 90 and 91 and selectively connecting these resistors into the input power supply to dolly wheel bridge 52, as just explained, a single ratio adjusting resistance, such as the resistance 90, may be provided and be readjusted by means of the sliding tap 92 to obtain the desired ratio, either $L_1/L_2$ for use in obtaining the projected tractor drive axle weight, or the ratio $$\frac{L_2 - L_1}{L_2}$$

for use in obtaining the projected tandem axle weight.

The circuit of FIG. 6 includes a meter or read-out device 48′ which is connected to a selector switch generally indicated at 98 including two movable contacts 100 and 102.

The output circuits of the strain gauge Wheatstone bridges for each of the respective axles and also for the dolly wheel legs 30 are connected to terminals adjacent the movable contacts 100, 102 of selector switch 98 to permit selective connection of any one of the Wheatstone bridges to the read-out device or meter 48′ and also to permit the series connection of various of the bridge output circuits to provide a reading of the total weight either on the unhooked trailer or on the hooked tractor-trailer combination. Thus, the output circuit of Wheatstone bridge 50 for the tandem axles 20–22 is connected by conductors 104 and 106 to terminals 108 and 110, respectively, so that when selector switch contacts 100 and 102 are respectively moved into contact with terminals 108 and 110, the weight on the tandem axles 20–22 can be read on read-out device 48′. Similarly, the output circuit of the dolly wheel strain gauge Wheatstone bridge 52 is connected by conductors 112 and 114, respectively, to terminals 116 and 118 so that when selector switch contacts 100 and 102 are engaged with terminals 116 and 118, the weight on the dolly wheel legs can be observed. It should be noted that if the conductor 86 which connects strain gauge bridge 52 to power supply 56 is connected in series with ratio resistance 90, the reading obtained on readout device 48′ will give the projected value of $W_c$, the projected weight on kingpin 14 of the trailer.

If selector switch contact 76 is moved into engagement with terminal 95, the ratio resistance 91 is included in the circuit from the power suppy 56 to input terminal 84 of dolly wheel bridge 52. This will multiply the voltage input to bridge 52 by the ratio $$L_2 - L_1 / L_2$$

If the voltage output of bridge 52 is then connected in series with the voltage output of bridge 50, a direct reading is obtained on read-out device 48′ of the projected value of $W_{a2}$, the hooked-up weight on the rear or tandem axles 18 or 18′ of the trailer.

If the switch contact 76 of selector switch 72 is engaged with terminal 96 to by-pass ratio resistances 90 and 91, the reading obtained on read-out device 48′ from the output circuit of dolly wheel bridge 52 will indicate the actual weight on the dolly wheel legs 30.

The output from the strain gauge Wheatstone bridge for rear drive axle 18 of tractor 10 is connected by conductors 120 and 122 to the respective terminals 124 and 126 so that when selector switch contacts 100 and 102 are respectively connected across terminals 126 and 124, a direct reading of the weight on rear axle 18 or axles 18′ of tractor 10 is obtained on readout device 48′.

Also, the output of the Wheatstone bridge for the strain gauges of the front steering axle 16 of the tractor is connected by conductors 128 and 130 to the terminals 132 and 134, respectively, so that when selector switch contacts 100 and 102 are respectively connected across terminals 134 and 132, the weight on front steering axle 16 may read directly on read-out device 48′.

Power supply 56 is connected by conductors 135 and 137 to the power input terminals of the Wheatstone bridges for the front steering axle 16 and for the drive axle 18 of the tractor.

It is also possible, with the circuit arrangement shown in FIG. 6 with the trailer unhooked to connect the outputs of the Wheatstone bridges 50 and 52 for the tandem axles and dolly wheels, respectively, in series with each other to provide a summation of the weight on the tandem axles and on the dolly wheel legs, to give the total weight of the unhooked trailer, as indicated by the equation: $W = W_a + W_b$.

This may be accomplished by moving movable switch contact 102 into engagement with terminal 118 to connect one side of read-out device 48′ to one side of the output of dolly wheel Wheatstone bridge 52, closing switch 136 to connect conductor 112 of the output circuit of dolly wheel bridge 52 to conductor 106 of the output circuit of tandem axle bridge 50, then closing switch contact 100 into engagement with terminal 108 to thereby complete the series connection of bridges 50 and 52 across readout device 48′. The connections just described will give a reading on the read-out device 48′ which is the sum of the output voltages of bridges 50 and 52, to thereby give the total weight on the unhooked trailer. With the connections just described, movable contact 76 of selector switch 72 should be connected to terminal 96 to thereby cause the power input circuit to dolly bridge 52 to by-pass the ratio resistances 90 and 91, since, with the series connection of the tandem axle bridge 50 and the dolly wheel bridge 52, the output of bridge 52 should not be multiplied by either of the factors $$\frac{L_1}{L_2} \text{ or } \frac{L_2 - L_1}{L_2}$$

as previously described, but should provide a direct reading of the weight on the dolly wheel legs 30.

With the tractor-trailer hooked up, the circuit of FIG. 6 can be used to obtain a total reading of the weights on the front steering axle 16, the rear drive axle 18, and on the tandem axles 20–22 by connecting the output voltages of the bridge circuits of these respective axles in series relation with each other to give the total weight on the axles of the hooked-up tractor-trailer. This may be accomplished by the circuit of FIG. 6 in the following manner: By closing selecor switch contact 100 into engagement with terminal 134, read-out device 48′ is connected to one side of the output circuit of the Wheatstone bridge for the front steering axle 16 of the tractor-trailer. The other side of the output circuit of the Wheatstone bridge for steering axle 16 is connected by conductor 128 to terminal 132, to which is affixed a movable switch contact 138 which may be moved into engagement with terminal 124 to provide a connection from the output circuit of the Wheatstone bridge of steering axle 16 to conductor 120 leading to one side of the output of the strain gauge Wheatstone bridge of rear drive axle 18 of the tractor. The opposite side of the output circuit of the Wheatstone bridge for drive axle 18 is connected to conductor 122, and by moving switch 126 at the end of conductor 122 into engagement with terminal 108, the output of the strain gauge bridge circuit for tractor drive axle 18 is connected to one side of the output circuit of tandem axle Wheatstone bridge 50. The opposite side of the output circuit of tandem axle bridge 50 is connected by conductor 106 to terminal 110, and by moving the selector switch contact 102 into engagement with terminal 110, the series circuit of the outputs of bridges for the steering axle 16, the tractor drive axle 18, and the tandem axles 20–22 of the trailer is completed back to read-out device 48′ to provide a reading of the total weights on the steering axle 16, the tractor drive axle 18, and the tandem axles 20–22.

In making the series connections just described, it is, of course, important that polarities of the output voltages be observed to obtain the proper additive relation of the output voltages of the various bridges.

In the installation of the electrical circuitry shown in FIG. 6, connections to the various strain gauges on the trailer may be brought out to plug-in receptacles on the exterior of the trailer body to permit connection to an external bench or console having the remainder of the circuitry and the read-out equipment, to provide convenient readings of the weight on the unhooked trailer as it is being loaded. Also, if desired, plug-in receptacles may be provided on the external surface of the tractor for connection of the strain gauges on the tractor axles to external circuitry and read-out equipment.

Utilizing the external plug-in receptacles and the electrically conducting connections between the trailer and the tractor, read-out equipment may be attached at any location on the inside of the tractor. The read-out equipment would include the indicating meter 48, the power supply 56, and may or may not include switches 72 and 98. Switches 72 and 98 could be mounted on the trailer or could be mounted externally of the trailer.

Readings may be taken of the unhooked trailer weights at a loading platform, using read-out equipment at an external bench, as previously mentioned. Also, readings may be taken of the hooked weight of the tractor-trailer at a highway check point, the readings being taken either on read-out equipment in the cab of the tractor, or on external equipment at the highway check point. Also, readings may be taken on read-out equipment in the cab of the tractor when picking up loads, or when unloading, to determine the weight of the pick-up load or the amount of weight unloaded.

*Correction to allow for displacement of trailer kingpin from tractor drive axle in projecting weight on tractor drive axle*

To simplify the explanation and discussion hereinbefore, it has been assumed that the weight $W_c$ acting at the kingpin 14 of the trailer is in the same vertical plane as the rear drive axle 18 of the tractor 10, or in the same vertical plane as the mid-point between the two tandem axles 18′ of the tractor, where the tractor has tandem axles.

Figure 7C:
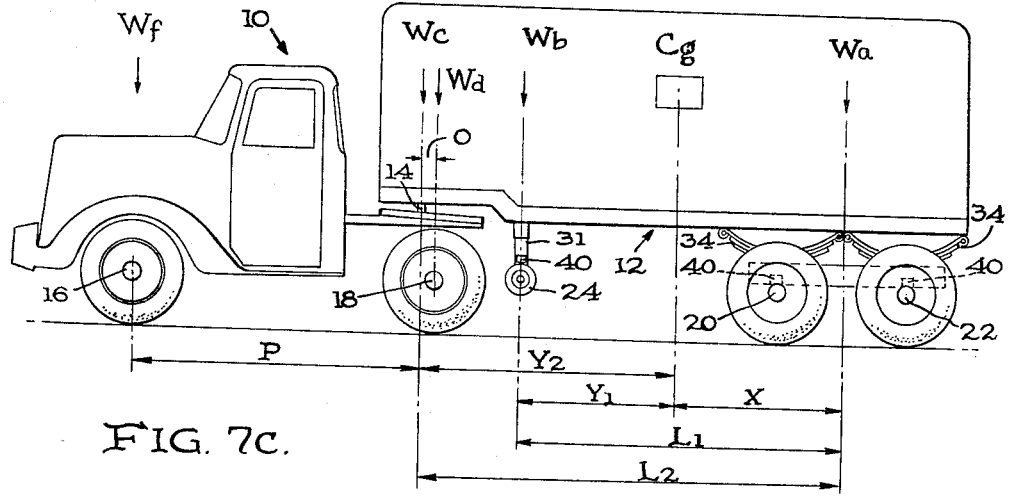
FIG. 7c is a schematic diagram showing the tractor connected to the trailer, and illustrating the relations which exist when the vertical axis of the kingpin on the trailer is offset from the vertical axis of the rear axle of the tractor.

For most practical purposes, this assumption is substantially correct, and the value of the weight on tractor drive axle 18 based on this assumption is substantially correct for most purposes. However, kingpin 14 is not necessarily in the same vertical plane as the tractor drive axle 18, but may be displaced a short distance therefrom as indicated in the diagrams of FIGS. 7(a), 7(b) and 7(c). In the diagrams of FIGS. 7(a), 7(b) and 7(c), the distance O is the horizontal distance from the rear drive axle 18 of the tractor to the vertical axis of kingpin 14, where the weight $W_c$ is applied, or is the horizontal distance from an axis centrally located between the two tandem axles 18' where the tractor has tandem drive axles, to the kingpin 14. In both FIGS. 7(a) and 7(b), the distance P is the horizontal distance from the front steering axle 16 to the vertical axis of kingpin 14.

The component of $W_c$ applied to the axle 18 or 18' of the tractor is determined by the ratio $$\frac{P}{O+P}(W_c)$$

while the component of the weight $W_c$ which falls on the front axle 16 is determined by the ratio $$\frac{O}{O+P}(W_c)$$

Thus, if the distance O is small, substantially all of the weight $W_c$ falls upon the rear drive axle 18, and the amount of weight falling on the front steering axle 16 may be substantially neglected.

In order to obtain a strictly accurate mathematical value for the component of the projected weight which falls on the tractor drive axle 18, where the drive axle 18 and kingpin 14 do not lie in the same vertical plane, the ratio resistance 90, which has heretofore been assumed to have the ratio $L_1/L_2$, should be modified to have the ratio $$\left(\frac{P}{O+P}\right)\left(\frac{L_1}{L_2}\right)$$

to give the projected weight on the tractor drive axle 18 when used as a multiplying factor to the input voltage to dolly wheel bridge 52. The ratio just given takes into account the displacement of the kingpin 14 from the rear axle 18 of the tractor 10.

Also, to obtain the total projected weight $W_d$ on tractor drive axle 18, the following equation is used:

$$W_d = \frac{P}{O+P}(W_c)$$

plus component of unladen weight of tractor and trailer on drive axle 18 or 18', or $$W_d = \frac{P}{O+P}\left(\frac{L_1}{L_2}\right)(W_b)$$

plus component of unladen weight of tractor and trailer on drive axle 18 or 18'.

Similarly, the total weight on the front tractor axle is obtained by the following equation:

$$W_f = \frac{O}{O+P}(W_c)$$

plus components of unladen weight of tractor and trailer on front axle, or $$W_f = \frac{O}{O+P}\left(\frac{L_1}{L_2}\right)(W_b)$$

plus component of unladen weight of tractor and trailer on front axle.

Since the unladen weight of the tractor is a known, constant value, and since the components of the unladen weight on the front axle 16 and on the drive axle 18 of the tractor are also known and constant and may be obtained from or calculated from manufacturer's specifications, the components due to unladen weight are fixed values which may be added by simple pencil-and-paper arithmetic to the projected values of $$\frac{O}{O+P}(W_c)$$

for the tractor front axle and to the projected value of $$\frac{P}{O+P}(W_c)$$

for the tractor rear drive axle 18.

A ratio resistor, not shown, may be connected by suitable switches into the power supply input to dolly wheel bridge 52 to satisfy the equation for $W_f$, in the same manner as that previously described for ratio resistors 90 and 91.

The constant values of the unladen weight components on the various axles may also be obtained as a component of the reading of read-out device 48' of FIG. 6 by adjustment of the zero adjusting resistance 78 of dolly wheel bridge 52 to cause a deflection of the read-out device 48' equivalent to the unladen weight component of the respective axle, this deflection being added to any further deflection due to payload.

*Momentum indicating device*

There is schematically shown in FIG. 8 the circuit of a momentum-indicating device which may be used to indicate the momentum of a moving truck or vehicle. The system of FIG. 8 includes strain gauge bridges 50, 53, and 55, which respectively measure the weight on the rear axle or tandem axles of the trailer, on the drive axle 18 of the tractor, and on the steering axle 16 of the tractor.

As has been previously explained, the total voltage output of these three bridges when connected in series additive relation to each other indicates the total weight of the hooked-up tractor trailer. The respective bridges are adjusted as previously explained so that the reading on each bridge includes the sum of the components of unladen weight and payload weight on the respective axles, so that the summation of the voltages of the three bridges 50, 53, and 55 represents the total or gross weight of the loaded tractor trailer, including the unladen weight plus the net or payload weight. The three bridges 50, 53, and 55 have their input terminals respectively connected to power supply 56. The voltage outputs of the three bridges 50, 53, 55 are connected in series with each other, the summation of the voltage of the three bridges being across the two conductors 150 and 152 at opposite ends of the series-connected bridges.

The momentum indicator is generally indicated at 154 and is preferably an electrical instrument of the electrodynamometer type, similar to the conventional wattmeter, including two coils 156 and 158, one of which is fixed, and the other of which is movable. In the embodiment of FIG. 8, it is assumed that coil 156 is movable and coil 158 is fixed.

Moving coil 156 is connected across the output voltage of the three bridges 50, 53, and 55, in series with an inclinometer which compensates for the effect on momentum of the angle of inclination of the roadway on which the vehicle is moving. The inclinometer 160 includes a movable tap member 162 which is swingably movable along an arcuate resistance 164 due to the connection of tap 162 to a swinging weight whose position relative to resistance 164 varies in accordance with the angular inclination of the truck or tractor-trailer. Resistance 164 varies on either side of the midpoint thereof (which corresponds to the position of tap 162 when the vehicle is on a horizontal surface), as a function of the sine of the angle of inclination of the vehicle relative to the horizontal. Variable resistors having a resistance value which varies as a sine function are known as are shown, for example, by United States Patents 2,554,811—Bromberg et al., and 2,979,681—Brown.

The inclinometer 160 is mounted in such manner that when the tractor-trailer moves downhill, movable weight 166 will move tap 162 to the right with respect to the view in FIG. 8 to thereby reduce the amount of resistance 164 in series with coil 156 as a function of sine $\theta$, and to move tap 162 to the left with respect to the view in FIG. 8 if the truck moves uphill, to thereby increase the amount of resistance 164 in series with coil 156 as a function of sine $\theta$. Thus, when the tractor moves downhill, less resistance 164 will be in series with coil 156 and an increased current will flow through coil 156 from the voltage output of the series-connected bridges 50, 53, 55 to compensate for the fact that the weight contributing to the momentum of the vehicle is greater than when the vehicle is moving on a level surface. When the vehicle moves uphill, the swinging weight 166 moves to the left with respect to the view in FIG. 8 and moves tap 162 to increase the amount of resistance 164 in series with coil 156, and thereby decreases the current flow through coil 156 for a given output voltage of bridges 150, 153, 155, thereby compensating for the fact that when the truck is moving uphill the component of weight contributing to the momentum is less than when the truck is traveling on level ground. When the truck is traveling on level ground, the tap 162 is at substantially the midpoint of the resistor 164, as indicated in FIG. 8.

A tachometer-generator 168 which has a voltage output proportional to the speed of the vehicle has its electrical output connected across the fixed coil 158. Thus, torque produced upon the moving coil 156 is proportional to the product of the currents through the two coils 156 and 158, and thus to the product of the speed of the vehicle, as measured by tachometer generator 168, and of the weight of the vehicle, measured by the strain gauge bridges 50, 53, 55, with the voltage output of the bridges being modified in accordance with the angular inclination of the vehicle as it moves along the highway, so that only the component of weight adding to or subtracting from the momentum of the moving vehicle is fed into coil 156. The movement of the moving coil 156, and of the pointer moved thereby, will thus always be proportional to the product of the speed of the vehicle and of the component of weight of the vehicle which is contributing to the momentum.

There is shown in FIG. 17 a modified circuit for the momentum indicating device which is generally similar to the circuit of FIG. 8 except that the battery power supply 56 of FIG. 8 has been eliminated and the tachometer generator 168' having a direct current output has been substituted in place thereof. The tachometer generator 168', like the tachometer generator 168 previously described, has a voltage output which is proportional to the speed of the vehicle. The momentum indicating device 154' of FIG. 17 has a single moving coil 156' which is connected across the output voltage of the bridge circuits 50-53-55 in series with inclinometer 160. Since the input voltage supply to the bridge circuits is supplied by the tachometer generator 168' and thus varies in accordance with changes in speed of the vehicle, and since the output voltage of the bridge circuits is a function of the load on the axles of the vehicle as modified by inclinometer 160, the current flow through moving coil 156' is a function of (1) the speed of the vehicle, (2) the load on the axles of the vehicle, and (3) the angle of inclination of the roadway. The momentum indicator 154' may have a d'Arsonval type movement, being provided with permanent magnet pole pieces with which the movable winding reacts to produce a movement of the movable coil and of a pointer attached thereto, in proportion to the various conditions just enumerated.

*Vertically oriented strain gauges*

The various strain gauges hereinbefore described such as gauges 40A, 40B, 40C, 40D, 40E, and 40F which are positioned on the various axles of the tractor-trailer have been described as being positioned on the upper or lower surfaces of the respective axles, preferably in the region between the spring hangers 36 and the innermost surface of the adjacent wheel. While strain gauges positioned on the upper and lower surfaces of the axles provide a satisfactory weight indication when the vehicle is being weighed under static conditions—that is, conditions which never vary from one weighing determination to another, it has been discovered that inaccuracies develop in the weighing operation under dynamic loading conditions in which loading conditions vary from one time to another. For example, such variations in loading conditions may be due to changes in tire pressure, tilting of the vehicle, or pebbles under the tires. When the strain gauges are horizontally oriented on the upper or lower surfaces of the axles, the stress measurement provided by the strain gauges depends upon the moment arm of weight translation from the axle to the ground, and under dynamic loading conditions, this moment arm varies due to such factors as changes in tire pressure, tilting of the vehicle, or pebbles under the tires as just explained.

By further experimentation, we have provided a solution for the problem just described which eliminates the effect of stress of moment and utilizes only the stress of weight on the axle. The stress of weight measured in this way is independent of moment and thus eliminates errors due to changes in dynamic loading conditions.

An axle, being a beam, or pipe-like, is loaded by the springs near each end of the axle. The wheels are mounted on the ends of the axle. The axle thus acts as a uniform beam loaded transversely with two load points and two reaction points. The axle between the springs and the wheels is under a varying amount of bending moment and a constant amount of stress due to weight. The stress due to weight is a "shear" stress normal to the bending moment of the axle and, as such, can be identified by the use of strain gauges.

In accordance with the solution provided for eliminating the effect of bending moment in the strain gauge reading, the strain gauge generally indicated at 200 in FIGS. 15 and 18 is positioned in vertically oriented relation on the surface of the stationary axle or axle housing 22'. The strain gauge 200 is preferably a resistance-type strain gauge such as the SR-4 bonded wire strain gauge manufactured by Baldwin-Lima-Hamilton Corporation. In this strain gauge, the strain-sensitive wire is arranged in a plurality of connected "hairpins" 204 lying in a common plane with each other. Each "hairpin" includes a pair of straight legs 206 and a curved end 208 connected to the legs of an adjacent "hairpin." The strain-sensitive wire is bonded to a protective backing 210 and the backing is cemented to the axle whose strain is being measured. The strain gauge 200 is secured to the axle in vertical oriented relation and with the legs 206 of the "hairpins" lying normal to the longitudinal axis of the axle or axle housing to which the strain gauge is secured. The strain gauge is attached to the axle by cementing or other suitable means and conforms to any curvature of the axle or axle housing, with the legs 206 of the "hairpins" remaining in planes substantially normal or perpendicular to the longitudinal axis of the axle or axle housing.

With the strain gauge 200 positioned in vertically oriented position on the axle as just described, the strain gauge will sense only the shear force on the axle due to the weight of the load on the axle, and will be independent of moment. Hence, the accuracy of the reading of the strain gauge will not be affected by changes in the moment arm of weight translation from the axle to the ground which may occur due to the various factors previously described.

It is preferred to use a resistance type wire strain gauge of the type just described in all of the various embodiments described throughout this application, including the strain gauges 40 with a letter subscript, such as 40A-40J, inclusive, and for the vertically oriented strain gauges 200 with letter subscripts. However, any other type of strain gauge capable of measuring shear force due to weight on the axle and substantially independent of changes in moment arm of weight translation from the axle to the ground may be used. Examples of other types of gauges which may be used include etched foil gauges, bonded foil gauges, semiconductor gauges, and crystal type gauges. All of the gauges hereinbefore described may be mounted with the strain sensing element in vertically oriented position normal to the longitudinal axis of the axle or axle housing and may be connected in an electrical circuit to provide an electrical indication of the shear force due to weight on the axle or axle housing, with the measurement being independent of changes in moment arm of the weight translation from axle to ground.

Referring now to FIG. 15, it will be noted that the strain gauge 200 is shown in vertical orientation on the axle 22'. Gauge 200 is shown positioned on the portion of the axle which lies between the axially outer surface of the spring hanger 36' and the adjacent surface of the wheel, which is the preferred location of the strain gauge. However, it is not necessary that the strain gauge 200 be so positioned, but instead the strain gauge 200 may be positioned anywhere along the length of the axle or axle housing and still provide an accurate measurement of shear force due to weight which is independent of changes in moment arm of the weight translation from axle to ground.

There is shown in FIG. 16 a diagram which indicates the results of tests made to compare the readings of horizontally oriented strain gauge 40', which is horizontally oriented similarly to the strain gauges 40 with letter subscript shown in FIGS. 1–6, with the readings of vertically oriented gauge 200, both gauges 40' and 200 being mounted on an axle section. Thus, there is shown in FIG. 16 a horizontally oriented strain gauge 40' positioned on the upper surface of the axle and a vertically oriented strain gauge 200 positioned on the vertical surface of the axle, as previously described. Each of the gauges 40' and 200 may be of the same type, such as a resistance wire strain gauge of the type shown in FIG. 18. A pair of similar gauges 40' and 200 may be located adjacent opposite ends of the axle. W indicates the point of application of the load to the axle, while A, B, and C represent different reaction points or wheel load points. Such variations in reaction points, such as A, B, and C, as previously explained, might be caused by change in tire pressure, tilting of the vehicle, or pebbles under the wheel.

With a constant weight of 5,000 pounds applied at W, the following readings were taken:

| Reaction Location | Strain in micro inch/inch | |
|---|---|---|
|  | Gauge 40' | Gauge 200 |
| B | 160 | 20 |
| C | 210 | 20 |

It will be noted from the above that with a constant applied load, the horizontally oriented gauge 40' gave different readings at points B and C, while the vertically oriented gauge 200 gave the same readings at points B and C.

In a second test, weights of varying magnitudes were applied at point W and readings were taken on vertically oriented gauge 200 at the various reaction points A, B, C, as follows:

| Weight in lbs. | Location | Strain Read-Out on Gauge 200 |
|---|---|---|
| 5,000 | A | 20 |
| 5,000 | B | 20 |
| 5,000 | C | 20 |
| 4,000 | A | 15 |
| 4,000 | B | 15 |
| 4,000 | C | 15 |
| 3,000 | A | 10 |
| 3,000 | B | 10 |
| 3,000 | C | 10 |

In a third test, an operating truck axle was loaded in a manner similar to that represented by the diagram of FIG. 16, with the following results:

| Weight in lbs. | Location | Strain in NM/in. | |
|---|---|---|---|
|  |  | Gauge 40' | Gauge 200 |
| 1,000 | A | 18 | 10 |
|  | B | 27 | 10 |
| 500 | B | 14 | 5 |
|  | C | 10 | 5 |

The foregoing tests show that a vertically oriented strain gauge provides the same reading for a given weight regardless of the point of reaction with the ground.

In taking readings of strain as measured by gauge 200, a Wheatstone bridge circuit such as that shown in FIG. 13 may be used, in which strain gauges 200A and 200B are located in diagonally opposite arms of the bridge. Gauges 200A and 200B may be located at spaced locations on the axle being measured as, for example, adjacent opposite ends of the axle. A resistance 42' which is not sensitive to strain is connected in series with strain gauge 200A and a resistance 44' and parallel-connected adjusting or calibrating resistance 46' are connected in series with strain gauge 200B. Resistances 44' and 46' are not sensitive to strain.

The strain gauges 200 may be used in the same manner as the strain gauges 40 for projecting the weight of the unhooked trailer into equivalent weight readings of the hooked-up trailer. The circuit shown in FIG. 14 utilizes strain gauges $200C_1$, $200C_2$, $200F_1$ and $200F_2$ in the bridge 50' as will now be described, in placed of strain gauges 40C and 40F of FIG. 6, and substitutes two inactive or dummy gauges or alternatively plain resistances in place of the strain gauges 40D and 40E of bridge 50 of FIG. 6. The circuit of FIG. 14 is otherwise similar in connections and operation to the circuit of FIG. 6.

Thus, the bridge 50' of FIG. 14 includes two strain gauges $200C_1$ and $200C_2$ which are connected in series with each other to define one arm of the bridge. Strain gauge $200C_1$ is mounted in vertically oriented position on the left side of the rear tandem axle such as axle 22 of FIG. 2, and strain gauge $200C_2$ is mounted in vertically oriented position on the right side of the rear tandem axle such as axle 22. The two gauges $200C_1$ and $200C_2$ are connected in series with a "dummy" resistance 200D which is insensitive to strain, and may be a strain gauge positioned in such manner as not to be affected by changes in strain.

In the diagonally opposite leg of the bridge to that in which strain gauges $200C_1$ and $200C_2$ are positioned, there are positioned two series-connected strain gauges $200F_1$ and $200F_2$. Strain gauge $200F_1$ is positioned in vertically oriented position on the left side of the front tandem axle such as axle 20 in FIG. 2, and strain gauge $200F_2$ is positioned in vertically oriented position on the right side of front tandem axle 20. The two series-connected strain gauges $200F_1$ and $200F_2$ are connected in series with a "dummy" gauge or resistance 200E which is insensitive to strain.

The electrical circuitry of FIG. 14 and the operation thereof will not be described in detail since, with the exceptions just described with respect to the circuit elements of bridge 50', the circuitry of FIG. 14 and its operation are the same as the circuitry and operation of FIG. 6. Except for the use of new reference numerals for the circuit elements of bridge 50', the same reference numerals are used for the other circuit elements of FIG. 14 as are used for the corresponding circuit elements of FIG. 6.

It can be seen that there is provided in accordance with this invention a vericle weighing apparatus and method which have great utility and which represent a distinct advance over the prior art. The positioning of the strain gauges at a critical location on the axle member in one embodiment of the invention, namely, between the spring hanger or support and the inner face of the adjacent wheel, locates the load sensing device or strain gauge at an optimum location at which maximum representative stress of the load is exerted. Furthermore, the strain gauges are mounted on a portion of the vehicle, namely, the axle, which does not become flaccid or distorted through use and which has a life equal to or exceeding that of the vehicle itself. In the modified embodiment of the invention, the use of the vertically oriented strain gauges on the axles provides an accurate measurement of the shear stress on the axle which is independent of changes in moment arm of the weight translation from the axle to the ground.

The apparatus and method of the invention permit the payload on the tractor-trailer and the gross or net axle weights to be measured progressively as the trailer is being loaded and while the tractor is unhooked, so that the weights on the unhooked trailer in accordance with the method of the invention may be projected into the equivalent hooked-up weights of the tractor and trailer members. The apparatus of the invention also permits direct measurement of the axle weights and gross and net weights of the hooked-up tractor-trailer.

Furthermore, there is provided in accordance with this invention a momentum indicating device which gives an indication of the momentum of the moving tractor-trailer based on the speed of the tractor-trailer and on the component of weight of the loaded trailer which contributes to the momentum.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

What we claim as our invention is:

1. In combination, a trailer for attachment to a tractor or the like, said trailer including rear axle means, a wheel mounted at each of the opposite ends of said axle means, a trailer body supported by said axle means, spring means interposed between said trailer body and said axle means, mounting means securing said spring means to said axle means, a first electric circuit including a strain gauge for sensing the load on said axle means and for providing an electrical indication representative of the sensed load on said axle means, said strain gauge being mounted on said axle means in vertical orientation whereby said strain gauge measures substantially only the weight on said axle means and is independent of the moment arm of weight translation from axle to ground, dolly wheel means mounted on said trailer body adjacent the forward end of the trailer body, said dolly wheel means being movable into ground-engaging position to support the forward end of the trailer body when the trailer is unhooked from the tractor, a second electric circuit including means for sensing the load on said dolly wheel means and for providing an electrical indication representative of the sensed load on said dolly wheel means, a read-out means, and means for separately connecting said first and second electric circuits to said read-out means for reading the indications of the respective circuits.

2. The combination defined in claim 1 including means for connecting the electrical indications of said first and second electrical circuits to said read-out means in electrically additive relation to each other to measure the sum of the loads on said axle means and on said dolly wheel means.

3. In combination, a trailer for attachment to a tractor or the like, said trailer including rear axle means, a wheel mounted at each of the opposite ends of said axle means, a trailer body supported by said axle means, spring means interposed between said trailer body and said axle means, mounting means securing said spring means to said axle means, a first electric circuit for measuring the load on said axle means including a strain gauge connected in said circuit, said strain gauge being secured to said axle means adjacent an end of said axle means and between said mounting means and the inner surface of the wheel mounted at the respective end of said axle means, said strain gauge being mounted on said axle means in vertical orientation whereby said strain gauge measures substantially only the weight on said axle means and is independent of the moment arm of weight translation from axle to ground, dolly wheel means mounted on said trailer body adjacent the forward end of the trailer body, said dolly wheel means being movable into ground-engaging position to support the forward end of the trailer body when the trailer is unhooked from the tractor, a second electric circuit for measuring the load on said dolly wheel means including a second strain gauge connected in said second circuit, said second strain gauge being secured to said dolly wheel means to detect strain on said dolly wheel means due to load thereon, a read-out means, and means for separately connecting said first and second electric circuits to said read-out means for measuring variations in the electrical characteristics of the respective circuits due to changes in characteristics of the strain gauges in the respective circuits.

4. The combination defined in claim 3 including means for connecting said first and second electrical circuits to said read-out means in electrically additive relation to each other to measure the sum of the loads on said axle means and said dolly wheel means.

5. In combination, a trailer adapted for attachment to a tractor, said trailer including a rear axle means defining a load bearing point when the trailer is unhooked from the tractor and also when the trailer is hooked to the tractor, said trailer including dolly wheel means defining a load bearing point only when the trailer is unhooked from the tractor, the tractor including front and rear axle means defining load bearing points only when the trailer is hooked to the tractor, sensing means for providing a measurement of the load on said trailer at at least the load bearing point defined by said dolly wheel means, when the trailer is unhooked from the tractor, and electrical circuit means connected to said sensing means for converting the load measurement of the load bearing point of the unhooked trailer into a projected load measurement of one of the load bearing points of the hooked-up tractor-trailer.

6. The combination defined in claim 5 in which said sensing means is a strain gauge.

7. In combination, a trailer including a kingpin adjacent the forward end thereof for attachment to a tractor contiguous the rear axle means of the tractor, said trailer including an axle means defining a first support and dolly wheel means defining a second support when the trailer is unhooked from the tractor, sensing means for measuring the load on said dolly wheel means when the trailer is unhooked from the tractor, and electrical circuit means connected to said sensing means for multiplying the load measured by said sensing means with the trailer unhooked by the ratio $$\left(\frac{P}{O+P}\right)\left(\frac{L_1}{L_2}\right)$$

to obtain an electrical indication of the projected load acting in line with the tractor rear axle means of the hooked-up tractor-trailer, where $O$ is the horizontal distance from the rear axle of a tractor having a single rear axle to the vertical axis of the kingpin of the trailer or from an axis centrally located between the rear tandem axles of a tractor having rear tandem axles to the vertical axis of the kingpin of the trailer;

$P$ is the horizontal distance from the front axle means of the tractor to the vertical axis of the kingpin of the trailer;

$L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

8. In combination, a trailer adapted for attachment to a tractor, said trailer including a rear axle means defining a load bearing point when the trailer is unhooked from the tractor, and also when the trailer is hooked to the tractor, at least one wheel mounted at each of the opposite ends of said axle means, dolly wheel means mounted on said trailer adjacent the forward end thereof, said dolly wheel means being movable into ground-engaging position when the trailer is unhooked from the tractor to define a load bearing point for the trailer only when the trailer is unhooked from the tractor, said trailer including a kingpin at the forward end thereof which defines a load bearing point only when the trailer is hooked to the tractor, the tractor including front and rear axle means defining load bearing points only when the trailer is hooked to the tractor, sensing means for sensing the load on at least one of said load bearing points of the unhooked trailer including at least the load bearing point defined by said dolly wheel means, said sensing means having a characteristic which changes in a manner representative of the sensed load on the respective load bearing point, and electrical circuit means for converting the changed characteristic of the sensing means corresponding to the load sensed on at least one of said load bearing points of the unhooked trailer into a signal representative of the load at a predetermined load bearing point of the hooked-up tractor-trailer.

9. In combination, a trailer adapted for attachment to a tractor, said trailer including dolly wheel means movable into ground-engaging position when the trailer is unhooked from the tractor, said dolly wheel means defining a load bearing point only when said trailer is unhooked from said tractor, said trailer including rear axle means defining a load bearing point when said trailer is unhooked from said tractor and also when said trailer is hooked to said tractor, said trailer including a kingpin at the forward end thereof, said kingpin comprising a load bearing point only when the trailer is hooked to a tractor, sensing means for measuring the load on said dolly wheel means when the trailer is unhooked from the tractor, and electrical circuit means connected to said sensing means for multiplying the load measured by said sensing means by the ratio $L_1/L_2$ to obtain the projected load acting in line with the kingpin of the trailer when the trailer is hooked to the tractor, where $L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

10. In combination, a trailer including a kingpin at the forward end thereof, for attachment to a tractor, said tractor having a front axle means and rear axle means, said trailer including dolly wheel means movable into ground-engaging position when the trailer is unhooked from the tractor, said dolly wheel means defining a load bearing point only when said trailer is unhooked from said tractor, said rear axle means of said tractor defining a load bearing point only when said trailer is hooked to said tractor, sensing means for measuring the load on said dolly wheel means when the trailer is unhooked from the tractor, and electrical circuit means connected to said sensing means for multiplying the load measure on said dolly wheel means by the ratio $$\left(\frac{P}{O+P}\right)\left(\frac{L_1}{L_2}\right)$$

to obtain the projected load acting in line with the rear axle means of the tractor when the trailer is hooked to the tractor, where O is the horizontal distance from the rear axle of a tractor having a single rear axle to the vertical axis of the kingpin of the trailer or from an axis centrally located between the rear tandem axles of a tractor having rear tandem axles to vertical axis of the kingpin of the trailer;

P is the horizontal distance from the front axle means of the tractor to the vertical axis of the kingpin of the trailer;

$L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

11. In combination, a trailer including a kingpin adjacent the forward end thereof for attachment to the tractor, said kingpin defining a load bearing point when the trailer is attached to the tractor, said trailer including a rear axle means, at least one wheel mounted at each of the opposite ends of said axle means, a trailer body supported by said axle means, said rear axle means defining a load bearing point when said trailer is unhooked from said tractor and also when said trailer is hooked to said tractor, dolly wheel means mounted on said trailer adjacent the forward end thereof, said dolly wheel means being movable into ground-engaging position to support the forward end of the trailer when the trailer is unhooked from the tractor to thereby define a load bearing point when the trailer is unhooked from the tractor, sensing means for sensing the load on said dolly wheel means with the trailer unhooked from the tractor, said sensing means having a characteristic which changes in a manner representative of the sensed load on the dolly wheel means to provide an electrical indication representative of the load on said dolly wheel means, and electrical circuit means for multiplying the sensed load on said dolly wheel means by the ratio $L_1/L_2$ to obtain the projected load acting in line with the kingpin of the trailer when the trailer is hooked to the tractor, where $L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

12. In combination, a trailer including a kingpin adjacent the forward end thereof for attachment to a tractor or the like, said trailer including rear axle means, at least one wheel mounted at each of the opposite ends of said axle means, a trailer body supported by said axle means, dolly wheel means mounted on said trailer adjacent the forward end thereof, said dolly wheel means being extensible into ground-engaging position to support the forward end of the trailer when the trailer is unhooked from the tractor, an electric circuit for measuring the load on said dolly wheel means with the trailer unhooked from the tractor including means for sensing the load on said dolly wheel means and for providing an electrical indication representative of the load on said dolly wheel means, and means for multiplying said electrical indication by the ratio $L_1/L_2$ to obtain the projected load acting in line with the kingpin of the trailer when the trailer is hooked to the tractor, where $L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

13. The combination defined in claim 12 where the means for multiplying said electrical indication by the ratio $L_1/L_2$ is a means for varying the voltage in said circuit whereby said electrical indication is correspondingly varied.

14. In combination, a trailer including a kingpin adjacent the forward end thereof for attachment to a tractor or the like, said trailer including rear axle means, at least one wheel mounted at each of the opposite ends of said axle means, a trailer body supported by said axle means, dolly wheel means mounted on said trailer adjacent the forward end thereof, said dolly wheel means being extensible into ground-engaging position to support the forward end of the trailer body when the trailer is unhooked from the tractor, an electric circuit for measuring the load on said dolly wheel means with the trailer unhooked from the tractor including means for sensing the load on said dolly wheel means and for providing an electrical indication representative of the load on said dolly wheel means, said electrical circuit including a read-out means calibrated in weight units based on a predetermined normal voltage supply to said circuit, means for multiplying the voltage supply to said circuit by the weight transfer ratio $L_1/L_2$ whereby the reading on said read-out means for a predetermined load on said dolly wheel means is correspondingly varied to thereby give the projected load acting in line with the kingpin of the trailer when the trailer is hooked to the tractor, where $L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

15. In combination, a trailer including a kingpin adjacent the forward end thereof for attachment to a tractor or the like, said trailer including a rear axle means, at least one wheel mounted at each of the opposite ends of said rear axle means, a trailer body supported by said rear axle means, dolly wheel means mounted on said trailer adjacent the forward end of the trailer body, said dolly wheel means being movable into ground-engaging position to support the forward end of the trailer when the trailer is unhooked from the tractor, an electric circuit including a Wheatstone bridge for measuring the load on said dolly wheel means, strain gauge means connected to said dolly wheel means to detect strain on said dolly wheel means and to provide an electrical indication representative of the load on said dolly wheel means with the trailer unhooked from the tractor, and means for multiplying said electrical indication by the weight transfer ratio $L_1/L_2$ to obtain the projected load acting in line with the kingpin of the trailer when the trailer is hooked to the tractor, where $L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

16. In combination, a trailer including a kingpin adjacent the forward end thereof for attachment to a tractor having a front axle means and a rear axle means, said trailer including a rear axle means, at least one wheel mounted at each of the opposite ends of said rear axle means, a trailer body supported by said rear axle means, dolly wheel means mounted on said trailer adjacent the forward end of the trailer, said dolly wheel means being extensible into ground-engaging position to support the forward end of the trailer when the trailer is unhooked from the tractor, an electric circuit for measuring the load on said dolly wheel means including strain gauge means connected in said circuit, said strain gauge means being secured to said dolly wheel means to detect strain on said dolly wheel means due to load thereon, means for obtaining an electrical indication from said electrical circuit representative of the load on said dolly wheel means with the trailer unhooked from the tractor, and means for multiplying said electrical indication by the ratio $$\left(\frac{P}{O+P}\right)\left(\frac{L_1}{L_2}\right)$$

to obtain an indication representative of the projected load acting in line with the rear axle means of the tractor when the trailer is hooked to the tractor, where O is the horizontal distance from the rear axle of a tractor having a single rear axle to the vertical axis of the kingpin of the trailer or from an axis centrally located between the rear tandem axles of a tractor having rear tandem axles to the vertical axis of the kingpin of the trailer;

P is the horizontal distance from the front axle means of the tractor to the vertical axis of the kingpin of the trailer;

$L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

17. In combination, a trailer including a kingpin adjacent the forward end thereof for attachment to a tractor or the like, said trailer including rear axle means, a wheel mounted at each of the opposite ends of said axle means, a trailer body supported by said rear axle means, a first electric circuit including means for sensing the load on said rear axle means and means for providing a first electrical output representative of the load on said axle means with the trailer unhooked from the tractor, dolly wheel means mounted on said trailer adjacent the forward end of said trailer, said dolly wheel means being extensible into ground-engaging position to support the forward end of the trailer when the trailer is unhooked from the tractor, a second electric circuit for measuring the load on said dolly wheel means including sensing means for sensing the load on said dolly wheel means with the trailer unhooked from the tractor and for providing an electrical indication representative of the unhooked load on said dolly wheel means, means for multiplying said electrical indication by the ratio $$\frac{L_2-L_1}{L_2}$$

to provide a second electrical output representative of the unhooked load on said dolly wheel means multiplied by said ratio, and means for adding said first and second electrical outputs together to obtain a total electrical output representative of the projected weight on said rear axle means when the trailer is hooked to the tractor to satisfy the equation $$W_{a2}=W_a+\left(\frac{L_2-L_1}{L_2}\right)(W_b)$$

where
- $W_{a2}$ is the weight acting on the rear axle means of the trailer with the trailer hooked to the tractor;
- $W_a$ is the weight on the rear axle means of the trailer with the trailer unhooked from the tractor;
- $W_b$ is the weight with the trailer unhooked acting on the dolly wheel legs of the trailer;
- $L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and
- $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

18. The method of weighing a loaded trailer of a tractor-trailer combination which comprises the steps of weighing the loaded trailer while it is unhooked from the tractor to obtain an indication representative of the weight measurement, and electrically multiplying said indication by a weight transfer formula to obtain the equivalent weight measurement of the hooked-up tractor-trailer.

19. The method of weighing a loaded trailer of a tractor-trailer combination which comprises the steps of measuring the load on the dolly wheels of the unhooked trailer to obtain an indication representative of the load on the dolly wheels, and electrically multiplying said undication by the weight transfer ratio $L_1/L_2$ to obtain the load on the kingpin of the trailer when the trailer is hooked to the tractor, where
- $L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and
- $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

20. The method of weighing a loaded trailer of a tractor-trailer combination which comprises the steps of measuring the load on the dolly wheels of the unhooked trailer to obtain an electrical signal representative of the load on the dolly wheels, and electrically multiplying said signal by the load transfer ratio $$\left(\frac{P}{O+P}\right)\left(\frac{L_1}{L_2}\right)$$

to obtain the projected load acting in line with the rear axle means of the tractor when the trailer is hooked to the tractor, where
- O is the horizontal distance from the rear axle of a tractor having a single rear axle to the vertical axis of the kingpin of the trailer or from an axis centrally located between the rear tandem axles of a tractor having rear tandem axles to the vertical axis of the kingpin of the trailer;
- P is the horizontal distance from the front axle means of the tractor to the vertical axis of the kingpin of the trailer;
- $L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and
- $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

21. In combination, a trailer including a kingpin at the forward end thereof for attachment to a tractor, said trailer having rear axle means, said trailer having a body supported by said axle means, ground-engaging wheel means mounted on said axle means, spring means interposed between the vehicle body and said axle means, mounting means securing said spring means to said axle means, dolly wheel means mounted on said trailer, said dolly wheel means being extensible into ground-engaging position to support the forward end of the trailer when the trailer is unhooked from the tractor, first strain gauge sensing means for providing a measurement of the load on said axle means when the trailer is unhooked from the tractor, said strain gauge sensing means being secured to said axle means adjacent an end thereof between said mounting means and the inner surface of the wheel mounted at the respective end of the axle means, a first electrical circuit including said first strain gauge sensing means and means for providing a first electrical output representative of the load on said rear axle means with the trailer unhooked from the tractor, a second electrical circuit for measuring the load on said dolly wheel means including second strain gauge sensing means for sensing the load on said dolly wheel means with the trailer unhooked from the tractor and for providing an electrical indication representative of the unhooked load on said dolly wheel means, means for multiplying said electrical indication by the ratio $$\frac{L_2-L_1}{L_2}$$

to provide a second electrical output representative of the unhooked load on said dolly wheel means multiplied by said ratio, and means for adding said first and second electrical outputs together to obtain a total electrical output representative of the projected weight on said rear axle means when the trailer is hooked to the tractor to satisfy the equation:

$$W_{a2} = W_a + \left(\frac{L_2 - L_1}{L_2}\right)(W_b)$$

where $W_{a2}$ is the weight acting on the rear axle means of the trailer with the trailer hooked to the tractor;

$W_a$ is the weight on the rear axle means of the trailer with the trailer unhooked from the tractor;

$W_b$ is the weight with the trailer unhooked acting on the dolly wheel means of the trailer;

$L_1$ is the horizontal distance from an axis centrally located between the rear tandem axles of a trailer having rear tandem axles to the vertical axis of the dolly wheel means or from the single rear axle of a trailer having a single rear axle to the vertical axis of the the dolly wheel means; and $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

22. In combination, a trailer including a kingpin at the forward end thereof for attachment to a tractor, said trailer having rear axle means, said trailer having a body supported by said axle means, ground-engaging wheel means mounted on said axle means, dolly wheel means mounted on said trailer, said dolly wheel means being extensible into ground-engaging position to support the forward end of the trailer when the trailer is unhooked from the tractor, first strain gauge sensing means for providing a measurement of the load on said axle means when the trailer is unhooked from the tractor, said first strain gauge sensing means being mounted on the surface of said axle means with the strain-sensing element of the gauge being oriented substantially normal to the longitudinal axis of the axle means so as to be substantially independent of the moment arm of weight translaion from axle to ground and so as to measure substantially only shear force due to weight on the axle means, a first electrical circuit including said first strain gauge sensing means and means for providing a first electrical output representative of the load on said rear axle means with the trailer unhooked from the tractor, a second electrical circuit for measuring the load on said dolly wheel means including second strain gauge sensing means for sensing the load on said dolly wheel means with the trailer unhooked from the tractor and for providing an electrical indication representative of the unhooked load on said dolly wheel means, means for multiplying said electrical indication by the ratio $$\frac{L_2 - L_1}{L_2}$$

to provide a second electrical output representative of the unhooked load on said dolly wheel means multiplied by said ratio, and means for adding said first and second electrical outputs together to obtain a total electrical output representative of the projected weight on said rear axle means when the trailer is hooked to the tractor to satisfy the equation:

$$W_{a2} = W_a + \left(\frac{L_2 - L_1}{L_2}\right)(W_b)$$

where $W_{a2}$ is the weight acting on the rear axle means of the trailer with the trailer hooked to the tractor;

$W_a$ is the weight on the rear axle means of the trailer with the trailer unhooked from the tractor;

$W_b$ is the weight with the trailer unhooked acting on the dolly wheel means of the trailer;

$L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

23. In combination, a trailer including a kingpin at the forward end thereof for attachment to a tractor, said trailer having rear axle means, said trailer having a body supported by said axle means, ground-engaging wheel means mounted on said axle means, spring means interposed between the vehicle body and said axle means, mounting means securing said spring means to said axle means, dolly wheel means mounted on said trailer, said dolly wheel means being extensible into ground-engaging position to support the forward end of the trailer when the trailer is unhooked from the tractor, first strain gauge sensing means for providing a measurement of the load on said axle means when the trailer is unhooked from the tractor, said first strain gauge sensing means being secured to said axle means adjacent an end thereof between said mounting means and the inner surface of the wheel mounted at the respective end of the axle means, said first strain gauge sensing means being mounted on the surface of said axle means with the strain sensing element of the gauge being oriented substantially normal to the longitudinal axis of the axle means so as to be substantially independent of the moment arm of weight translation from axle to ground and so as to measure substantially only shear force due to weight on the axle means, a first electrical circuit including said first strain gauge sensing means and means for providing a first electrical output representative of the load on said rear axle means with the trailer unhooked from the tractor, a second electrical circuit for measuring the load on said dolly wheel means including second strain gauge sensing means for sensing the load on said dolly wheel means with the trailer unhooked from the tractor and for providing an electrical indication representative of the unhooked load on said dolly wheel means, means for multiplying said electrical indication by the ratio $$\frac{L_2 - L_1}{L_2}$$

to provide a second electrical output representative of the unhooked load on said dolly wheel means multiplied by said ratio, and means for adding said first and second electrical outputs together to obtain a total electrical output representative of the projected weight on said rear axle means when the trailer is hooked to the tractor to satisfy the equation:

$$W_{a2} = W_a + \left(\frac{L_2 - L_1}{L_2}\right)(W_b)$$

where $W_{a2}$ is the weight acting on the rear axle means of the trailer with the trailer hooked to the tractor;

$W_a$ is the weight on the rear axle means of the trailer with the trailer unhooked from the tractor;

$W_b$ is the weight with the trailer unhooked acting on the dolly wheel means of the trailer;

$L_1$ is the horizontal distance from an axis centrally located between the rear tandem axles of a trailer having rear tandem axles to the vertical axis of the dolly wheel means or from the single rear axle of a trailer having a single rear axle to the vertical axis of the dolly wheel means; and $L_2$ is the horizontal distance from an axis centrally located between the rear tandem axles of a trailer having rear tandem axles to the vertical axis of the kingpin of the trailer or from the single rear axle of a trailer having a single rear axle to the vertical axis of the kingpin of the trailer.

References Cited by the Examiner
UNITED STATES PATENTS

| | | | |
|---|---|---|---|
| 2,179,822 | 11/1939 | Imm | 236—61 |
| 2,453,607 | 11/1948 | Wardle et al. | 177—136 X |
| 2,520,428 | 8/1950 | Nilakatan | 235—179 |
| 2,577,691 | 12/1951 | Schrader et al. | 177—138 |
| 2,615,330 | 10/1952 | Blackmon et al. | 177—211 X |
| 2,630,007 | 3/1953 | Howe et al. | 235—179 |
| 2,646,272 | 7/1953 | Swift | 177—141 |
| 2,858,070 | 10/1958 | Scharff | 235—179 |
| 2,933,302 | 4/1960 | Cordell | 177—137 |
| 3,054,892 | 9/1962 | Mowery | 246—182 |
| 3,070,306 | 12/1962 | Du Bois | 235—179 |
| 3,078,937 | 2/1963 | Mehki et al. | 177—141 |
| 3,093,200 | 6/1963 | Raskin | 177—1 |
| 3,109,505 | 11/1963 | Davis et al. | 177—137 |
| 3,167,138 | 1/1965 | Slabbert | 177—1 |

RICHARD B. WILKINSON, *Primary Examiner.*

LEO SMILOW, LOUIS J. CAPOZI, *Examiners.*

G. J. PORTER, R. S. WARD, *Assistant Examiners.*